(12) United States Patent
Baker

(10) Patent No.: US 9,779,454 B2
(45) Date of Patent: Oct. 3, 2017

(54) SPEED ADJUSTABLE AND REVERSIBLE TOOL FOR SLICER ORDERS

(71) Applicant: Trading Technologies International, Inc., Chicago, IL (US)

(72) Inventor: William Tigard Baker, Hoffman Estates, IL (US)

(73) Assignee: Trading Technologies International, Inc., Chicago, IL (US)

( * ) Notice: Subject to any disclaimer, the term of this patent is extended or adjusted under 35 U.S.C. 154(b) by 82 days.

(21) Appl. No.: 13/722,692

(22) Filed: Dec. 20, 2012

(65) Prior Publication Data

US 2014/0180890 A1 Jun. 26, 2014

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
USPC ..................................................... 705/35–45
See application file for complete search history.

(56) References Cited

U.S. PATENT DOCUMENTS

| | | |
|---|---|---|
| 6,401,080 B1 | 6/2002 | Bigus et al. |
| 6,615,188 B1 | 9/2003 | Breen et al. |
| 6,772,132 B1 | 8/2004 | Kemp, II et al. |
| 6,912,511 B1 | 6/2005 | Eliezer et al. |
| 6,983,260 B2 | 1/2006 | Hummelgren |
| 7,127,424 B2 | 10/2006 | Kemp, II et al. |
| 7,181,425 B1 | 2/2007 | Cha |
| 7,243,082 B1 | 7/2007 | Forlai |
| 7,299,207 B1 | 11/2007 | Gologorsky et al. |
| 7,299,208 B1 | 11/2007 | Bailon et al. |
| 7,305,361 B2 | 12/2007 | Otero et al. |
| 7,359,877 B2 | 4/2008 | Malitzis et al. |
| 7,379,909 B1 | 5/2008 | Cruz et al. |
| 7,389,268 B1 | 6/2008 | Kemp, II et al. |
| 7,406,444 B2 | 7/2008 | Eng et al. |
| 7,428,506 B2 | 9/2008 | Waelbroeck et al. |
| 7,496,535 B2 | 2/2009 | Otero et al. |

(Continued)

FOREIGN PATENT DOCUMENTS

| | | |
|---|---|---|
| CA | 2724040 A | 12/2009 |
| EP | 1104904 A | 6/2001 |

(Continued)

OTHER PUBLICATIONS

Unpublished U.S. Appl. No. 13/416,561, entitled "Slicer Order Quantity Reduction Tool," filed Mar. 9, 2012 in the name of William Tigard Baker et al.

(Continued)

*Primary Examiner* — Greg Pollock
(74) *Attorney, Agent, or Firm* — McDonnell Boehnen Hulbert & Berghoff LLP

(57) ABSTRACT

A speed adjustable and reversible tool for slicer orders is used to adjust one or more parameters of a slicer order that has been submitted for trading or otherwise includes one or more child order to be submitted for trading. A user input device, or controller may be used to receive a command, such as by sliding one or more sliders along a range to affect adjustment of one or more corresponding parameters of the slicer order and child orders.

19 Claims, 7 Drawing Sheets

(56) References Cited

U.S. PATENT DOCUMENTS

| | | |
|---|---|---|
| 7,613,647 B1 | 11/2009 | Cushing et al. |
| 7,617,144 B2 | 11/2009 | Madoff et al. |
| 7,653,589 B1 | 1/2010 | Schluetter et al. |
| 7,685,052 B2 | 3/2010 | Waelbroeck et al. |
| 7,822,672 B2 | 10/2010 | Hausman |
| 8,037,422 B1 | 10/2011 | Buck |
| 8,041,622 B1 | 10/2011 | Schluetter et al. |
| 8,380,575 B2 | 2/2013 | Foygel et al. |
| 2001/0032163 A1 | 10/2001 | Fertic et al. |
| 2001/0044752 A1 | 11/2001 | Hirakawa |
| 2001/0044767 A1 | 11/2001 | Madoff et al. |
| 2002/0032643 A1 | 3/2002 | Himmelstein |
| 2002/0046146 A1 | 4/2002 | Otero et al. |
| 2002/0046149 A1 | 4/2002 | Otero et al. |
| 2002/0046151 A1 | 4/2002 | Otero et al. |
| 2002/0046156 A1 | 4/2002 | Horn et al. |
| 2002/0049661 A1 | 4/2002 | Otero et al. |
| 2002/0052816 A1 | 5/2002 | Clenaghan et al. |
| 2002/0052827 A1 | 5/2002 | Waelbroeck et al. |
| 2002/0073016 A1 | 6/2002 | Furbush et al. |
| 2002/0091624 A1 | 7/2002 | Glodjo et al. |
| 2002/0133454 A1 | 9/2002 | Malitzis et al. |
| 2002/0147675 A1 | 10/2002 | Das et al. |
| 2002/0178104 A1 | 11/2002 | Hausman |
| 2003/0033235 A1 | 2/2003 | Hummelgren |
| 2003/0093359 A1 | 5/2003 | Martyn et al. |
| 2003/0126065 A1 | 7/2003 | Eng et al. |
| 2003/0167224 A1 | 9/2003 | Periwal |
| 2003/0236737 A1 | 12/2003 | Kemp, II et al. |
| 2004/0059666 A1 | 3/2004 | Waelbroeck et al. |
| 2004/0143539 A1 | 7/2004 | Penney et al. |
| 2006/0129473 A1* | 6/2006 | Hansen et al. .................. 705/37 |
| 2009/0089202 A1 | 4/2009 | Rowley |
| 2009/0299890 A1 | 12/2009 | Kontos et al. |
| 2010/0332367 A1 | 12/2010 | Foygel et al. |
| 2011/0047095 A1 | 2/2011 | Cushing et al. |
| 2011/0145125 A1 | 6/2011 | Foygel et al. |
| 2011/0307372 A1 | 12/2011 | Schluetter et al. |
| 2011/0313907 A1 | 12/2011 | Schluetter et al. |
| 2011/0313908 A1 | 12/2011 | Schluetter et al. |
| 2011/0313909 A1 | 12/2011 | Schluetter et al. |
| 2012/0005060 A1 | 1/2012 | Carroll et al. |
| 2012/0197778 A1 | 8/2012 | Hansen et al. |
| 2012/0290464 A1 | 11/2012 | Borkovec et al. |
| 2013/0238479 A1 | 9/2013 | Baker et al. |
| 2013/0246241 A1 | 9/2013 | Baker et al. |

FOREIGN PATENT DOCUMENTS

| | | |
|---|---|---|
| WO | 00/51043 A1 | 8/2000 |
| WO | 00/65510 A1 | 11/2000 |
| WO | 01/22266 A2 | 3/2001 |
| WO | 02/33621 A1 | 4/2002 |
| WO | 02/33623 A1 | 4/2002 |
| WO | 02/33635 A1 | 4/2002 |
| WO | 02/33636 A1 | 4/2002 |
| WO | 02/33637 A1 | 4/2002 |
| WO | 02/086657 A2 | 10/2002 |
| WO | 02/093325 A2 | 11/2002 |
| WO | 2009/146363 A1 | 12/2009 |
| WO | 2012/003093 A1 | 1/2012 |

OTHER PUBLICATIONS

U.S. Appl. No. 13/737,715, filed Jan. 9, 2013, Baker, et al.

Foley, K., "Electronic Trading Networks, Stock Exchange Competition," FDCH Congressional Testimony, Oct. 17, 2002.

Schnitzlein, C., "Call and Continuous Trading Mechanisms Under Asymmetric Information: An Experimental Investigation," Journal of Finance, vol. L1, No. 2, Jun. 1996, pp. 613-636.

Trading Technologies Online Product Help, Sliced Orders [online], [retrieved on Apr. 2, 2012]. Retrieved from the Internet <URL: https://www.tradingtechnologies.com/help/X_ TRADER-7.9.X/Default.htm>.

Trading Technologies, Staged Orders in X_ Trader® 7 .11.x, Setup Guide, Oct. 25, 2011, 18 pages.

Trading Technologies, Synthetic Order Entry in X_ Trader® 7.11.x, Setup Guide, Mar. 20, 2012, 36 pages.

Trading Technologies, Synthetic Order Entry in X_ Trader® presentation [online] [retrieved on Apr. 2, 2012]. Available on the Internet <https://www.tradingtechnologies.com/Giobal/elearning/Synthetic%20rder%20Entry%20in%20X_ TRADER.exe>.

Trading Technologies, Synthetic Strategy Engine [online], [retrieved on Apr. 2, 2012]. Retrieved from the Internet <URL: http://https://www.tradingtechnologies.com/synthetic-se />.

Unpublished U.S. Appl. No. 13/737,715, filed Jan. 9, 2013, in the name of William Tigard Baker.

International Search Report and Written Opinion of International Application No. PCT/US2013/071325 dated Feb. 20, 2014 (mailed Mar. 10, 2014).

* cited by examiner

SLICED ORDER

| | EXCH | PROD | CONTRACT | STATUS | B/S | ORDER QTY | UND QTY | FILLED QTY | PRICE | ORDER TYPE | TIF | MOD. | TRIGGER PRICE | ADV. |
|---|---|---|---|---|---|---|---|---|---|---|---|---|---|---|
| 1 | *CME | ES | SEP12 | WORKING | B | 2000 | 0 | 0 | [LTP-1] | LIMIT | GTD | | | TIME SLICED |
| -1.1 | CME | ES | SEP12 | WORKING | B | 400 | | | 101300 | LIMIT | GTD | | | |
| -1.2 | CME | ES | SEP12 | WORKING | B | 600 | | | 101250 | LIMIT | GTD | | | |
| -1.3 | CME | ES | SEP12 | WORKING | B | 400 | | | 101325 | LIMIT | GTD | | | |
| -1.4 | CME | ES | SEP12 | WORKING | B | 200 | | | 101375 | LIMIT | GTD | | | |
| -1.5 | CME | ES | SEP12 | WORKING | B | 400 | | | 101325 | LIMIT | GTD | | | |

*FIGURE 3*

SPEED ADJUSTABLE AND REVERSIBLE TOOL FOR SLICER ORDERS

CROSS-REFERENCE TO RELATED APPLICATIONS

This patent document is related to U.S. patent application Ser. No. 13/416,561, titled "Slicer Order Quantity Reduction Tool," filed on Mar. 9, 2012, the content of which is incorporated in its entirety herein.

BACKGROUND

Electronic trading systems generally include one or more trading device in communication with one or more electronic exchanges. In general, an electronic exchange receives messages for orders from a trading device, attempts to match quantity of the order with quantity of one or more contra-side orders at the electronic exchange (also referred to as in the market), and sends information about the matched orders or the market to the trading device. The information that is sent from the electronic exchange may include prices and quantities of the orders in the market, prices and quantities of matched orders and other information.

A slicer order is a strategy that involves splitting, breaking or otherwise slicing one order into multiple component orders. The component orders may be traded independently, consecutively, simultaneously and/or separately. For example, an order may be time sliced and/or volume sliced. Slicer orders may be desirable, for example, to reduce a market impact such as for a larger quantity of an order relative to a market.

BRIEF DESCRIPTION OF THE FIGURES

Exemplary embodiments for a speed adjustable and reversible tool for slicer orders may include methods, systems, apparatuses, and the like and are disclosed with reference to the following drawings.

FIG. 3 is a screenshot of a user interface for communicating slicer order information.

Figure 1:
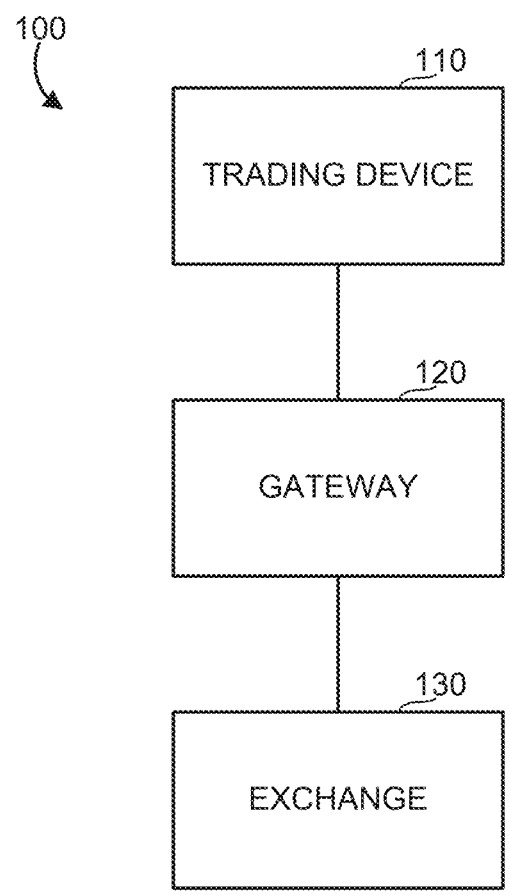
FIG. 1 is a block diagram of an example electronic trading system in which embodiments for a speed adjustable and reversible tool for slicer orders may be employed.

Additional or alternative embodiments are also understood when read in conjunction with the drawings, which illustrate exemplary embodiments for a speed adjustable and reversible tool for slicer orders. It should be understood that the exemplary embodiments described herein are not limited to the arrangements and instrumentality shown in the attached drawings.

DETAILED DESCRIPTION

I. Brief Description

The disclosed exemplary embodiments generally relate to a speed adjustable and reversible tool for slicer orders. A slicer order generally includes a strategy, a trading strategy, or synthetic strategy for splitting, breaking or otherwise slicing one order into multiple component orders. The component orders may be traded independently, consecutively, simultaneously and/or separately.

A trading device may formulate a slicer order from one or more orders to multiple constituent component orders and submit those component orders for trading. The component orders are based on instructions provided by a user to assist the user. The order to be sliced is referred to as a slicer order or parent order, and the component orders of that slicer or parent order are referred to herein as child orders. The parent order has an original quantity that may be considered broken down into component quantities in the child orders that add up to the original quantity of the parent order.

Slicer orders include multiple forms or types, including, for example, time slicer orders and volume slicer orders. Depending on a type of slicer order, each child order is triggered (for example, sent to a market or an exchange) in response to one or more events or conditions. In an example, the child orders of a time slicer order are sent to one or more markets after a time interval. The time may be defined in the time slicer order as the trigger. The time interval may be constant, variable, and/or respective to each of the component child orders. A time slicer order may be based on one or more clocks. Each time the clock reaches a time interval, a trading device sends one or more of the child orders to the market(s). For example, a time slicer order may be defined such that one of the child orders is sent every five or ten minutes.

A slicer order may also be a volume slicer order. In an example for a volume slicer order, child orders are sent to one or more markets in response a designated trading volume. For example, child slicer orders are sent when the market(s) experience a designated trading volume. In such instances, one or more child orders of a volume slicer order are sent to the market(s) when the market(s) for which the child order(s) are destined have sufficient activity. The activity may be defined such as in settings associated with the volume slicer order. For example, a volume slicer order may be defined such that one of the child orders is sent each time the destination market executes trade(s) five hundred of the corresponding tradeable object.

Slicer orders may be based on other types of triggering conditions or events. For example, child orders may be triggered by an amount of rainfall in a particular region, by daily temperature readings in a particular region, etc. Additionally or alternatively, a slicer order (of any type) could be configured to respond to user input to send one or more child orders at a non-scheduled time or a time not automatically triggered by, for example, a preconfigured triggering event. A user also may trigger conveyance of one or more child orders to one or more markets at any time. In addition, slicer orders also may be triggered by a combination of events of combinations, such as a combination time slicer order and volume slicer order.

A slicer order generally reduces the impact of a larger order on a market. For example, an order for a total desired quantity that is large relative to the market liquidity may have an impact more adverse to the trader of the order than smaller orders, or orders that are more relative to the general size of the orders in the market. If large enough, the order may adversely impact a price at which the order may be traded. In such instances, a slicer order can be utilized to break the large order into multiple relatively smaller orders, also referred to as child orders. The smaller orders may be individually placed or submitted to the market, and thus less likely to adversely impact the respective market than the larger parent order. The slicer order may, for example, be a time slicer order. Additionally or alternatively, a volume slicer order can be utilized to place child orders into a market based on volume of activity, such as the volume at the market. These and other types of slicer orders can be utilized to implement additional or alternative strategies or to achieve additional or alternative benefits.

Embodiments for a speed adjustable and reversible tool for slicer orders generally relate to reducing a total quantity of a larger order or slicer order in accordance with a request received from a user. The request for example may be received from the user from a trading device, a client device, a client trading device or some other device which enables a user to provide instructions for carrying out a slicer order.

To enable a reduction, a speed adjustable and reversible tool for slicer orders may sort child orders that make up a parent order according to a distance from market associated with each child order. The child order farthest from the market may be the child order having a buy or sell price furthest away from the current market price, the child order most recently sent to the market and/or the child order currently scheduled to be the last of the child orders sent to the market. Additional or alternative techniques are possible for determining a distance from market for the child orders of the parent order. In general, a child order that is farther from the market than other child orders will be filled (or at least partially filled) after the other child orders.

Thus, a speed adjustable and reversible tool for slicer orders may, for example, provide for adjustment for one or more parameters of a slicer order that has been submitted for trading. The parameters may include a time interval between submissions of child orders of the slicer orders, a volume or quantity executed in a market for a tradeable object between submissions of child orders for the tradeable object, or the quantity of each child order submitted. The slicer order may have at least one order pending or working at the electronic exchange at the time or prior to adjustments to the parameters are received. In addition, the slicer order may have some or part of a total quantity of the slicer order executed, matched or otherwise traded at the time or prior to adjustments to the parameters are received. In addition, a speed adjustable and reversible tool for slicer orders may, for example, cancel or remove orders from the market. In an example, an interval for removing the child orders is adjustable.

Although the following discloses embodiments including, among other components, software executed on hardware and/or firmware, it should be noted that the embodiments are merely illustrative and should not be considered as limiting. For example, it is contemplated that any or all of these disclosed examples may be embodied in hardware, exclusively in software, exclusively in firmware, or in any combination of hardware, software, and/or firmware. Accordingly, the disclosed embodiments may be implemented in multiple ways.

A method for a speed adjustable and reversible tool for slicer orders includes receiving parameters for implementing a slicer order for a tradeable object, generating child orders for the slicer order according to parameters and where a total quantity of the plurality of child orders is for the quantity, in response to a receiving a user input to submit the slicer order for trading a quantity of the tradeable object, submitting the child orders for trading according to the plurality of parameters, adjusting at least one parameter in response to receiving another user command to adjust the at least one parameter, and submitting the child orders for trading according to the adjusted at least one parameter.

A tangible computer readable medium having instructions stored thereon that when executed by a processor may cause the processor to execute acts including receiving parameters for implementing a slicer order for a tradeable object, generating child orders for the slicer order according to parameters and where a total quantity of the plurality of child orders is for the quantity, in response to a receiving a user input to submit the slicer order for trading a quantity of the tradeable object, submitting the child orders for trading according to the plurality of parameters, adjusting at least one parameter in response to receiving another user command to adjust the at least one parameter, and submitting the child orders for trading according to the adjusted at least one parameter.

An apparatus for a speed adjustable and reversible tool for slicer orders includes a processor that is configured to receive parameters for implementing a slicer order for a tradeable object, generate child orders for the slicer order according to parameters and where a total quantity of the plurality of child orders is for the quantity, in response to a receiving a user input to submit the slicer order for trading a quantity of the tradeable object, submit the child orders for trading according to the plurality of parameters, adjust at least one parameter in response to receiving another user command to adjust the at least one parameter, and submit the child orders for trading according to the adjusted at least one parameter.

II. Example Electronic Trading System

FIG. 1 illustrates a block diagram of an exemplary electronic trading system 100 in which a speed adjustable and reversible tool for slicer orders may be employed. The system 100 includes a trading device 110, a gateway 120, and an electronic exchange 130. The trading device 110 is in communication with the gateway 120. The gateway 120 is in communication with the exchange 130. The trading device 110 may also be incorporated with or integral with the gateway 120 and vice versa. The gateway 120 may not be employed between the trading device and the electronic exchange 130. Though not shown, the system 100 may include other devices specific to communications architecture such as middleware, firewalls, hubs, switches, routers, exchange-specific communication equipment, modems, security managers, and/or encryption/decryption devices.

As used herein, the phrase "in communication with" may include in direct communication and indirect communication through one or more intermediary components. The phrase "in communication with" may as be considered "connected to, coupled with, and the like. The communications includes electronic and/or electric wired and wireless communications.

In an example, the trading device 110 sends orders or order messages to the exchange 130. The orders or order messages generally include orders for a buy for a tradeable object, orders for a sell for the tradeable object, and messages or other instruction related to previously submitted orders. The previously submitted orders may be pending at the exchange or previously executed. In an example, a user utilizes the trading device 110 to send the orders to the exchange 130 through the gateway 120. In an example, orders are sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system.

In an example, the exchange 130 sends or otherwise distributes market data. The market data may be received by the trading device 110, such as through the gateway 120. The trading device 110 may also monitor or be used to monitor the market data and/or base one or more decision related to sending one or more orders and/or order messages to the exchange 130.

A tradeable object is generally anything that may be traded or otherwise exchanged. The tradeable object is generally defined by at least a quantity of the object and/or a price. For example, financial products, including stocks, bonds, options, futures, currency, warrants, funds derivatives, securities, commodities, equities, swaps, interest rate products, index-based products, traded events, goods, and collections and/or combinations of these, may be tradeable objects. A tradeable object may be "real" or "synthetic." A real tradeable object generally includes a financial product that is listed and/or administered by an exchange. A real tradeable object may also be considered an over-the-counter product. A synthetic tradeable object generally includes a financial product that is defined by the user. For example, a synthetic tradeable object includes a combination of real (or other synthetic) products such as a synthetic spread with multiple legs each for a real tradeable object created by a user utilizing a trading device 110. A real tradeable object also may correspond and/or is similar to a synthetic tradeable object or other trading strategy defined by a user.

The trading device 110 may include one or more electronic computing platforms such as a hand-held device, laptop, client device, client trading device, desktop computer, tablet, handheld device, workstation with a single or multi-core processor, server with multiple processors, and/or cluster of computers, for example. In an example, the trading device 100 includes a trading terminal and a server, and thus, while logically represented as a single device, trading device 110 in FIG. 1, the trading device 110 may be separable components or a unitary device. The trading device 110 may provide a trading screen or other display for a user. The trading device 110 may communicate commands to gateway 120, such as via a server for further processing, such as submitting one or more orders.

The trading device 110 is generally owned, possessed, operated, controlled, programmed by, configured by, and/or otherwise used by a user. As used herein, the term "user" may include, but is not limited to, a human (for example, a trader) and/or an electronic trading device (for example, an algorithmic trading system). One or more users may be involved in the ownership, possession, operation, control, programming, configuration, or other use.

The trading device 110 may include one or more trading applications. In an example, the trading application(s) process market data by arranging and displaying market data that is distributed by an exchange in trading and/or charting windows. Additionally or alternatively, the market data is generated by and/or received from a simulation environment that provides historical data and/or simulates an exchange but does not effectuate real-world trades. Processing may be based on user preferences. In an example, the trading application(s) includes an automated trading tool, such as an automated spread trading tool. The one or more trading applications is distributed across one or more of the computing devices of the trading device 110. For example, components of a trading application are executed on a trading workstation and other components are executed on a server in communication with the workstation.

The trading device 110 also or alternatively may include an electronic trading workstation, a portable trading device, an algorithmic trading system such as a "black box" or "grey box" system, an embedded trading system, and/or an automated trading tool. For example, the trading device 110 may be a computing system executing a copy of X_TRADER®, an electronic trading platform provided by Trading Technologies International, Inc. of Chicago, Ill. As another example, the trading device 110 may be a computing device running an automated trading tool such as Autospreader®, Autotrader™, ADL®, also provided by Trading Technologies International, Inc.

The trading device 110 also or alternatively may include a trading application that algorithmically processes market data. The trading device may include a user interface such as for manual placement of orders based on the algorithmic processing or to manipulate orders that were placed automatically or algorithmically. Such a trading application may be considered an algorithmic trading application. The algorithmic trading application generally includes an automatically processed algorithm to perform designated actions and/or includes an automated series of instructions to perform defined action(s). The actions generally include processing market data, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, monitoring market conditions and external events, and delaying action for a period of time, for example.

An algorithm (also referred to as a trading algorithm) may be defined as by logic expressions and parameters that describe the algorithm for trading one or more tradeable objects. Logic expressions specify the relationship between parameters and may generate more parameters such as, for example, inputs into one or more logic expressions of the algorithm. The definition of an algorithm may be, at least in part, specified by the algorithmic trading application. For example, an algorithmic trading application may allow a user to specify only parameters that are used by pre-defined logic expressions and/or specify some or all of the logic expressions and/or some or all of the parameters. A trading algorithm where the logic expressions are specified by a user may be referred to as a user-defined trading algorithm.

Trading applications may be stored in a computer readable medium. The computer readable medium may be an integral or separable component of the trading device 110. In an example, one or more components of a trading application are stored on a trading workstation while other components of the trading application are stored on a server in communication with the workstation. One or more components of a trading application also or alternatively are loaded into the computer readable medium of the trading device 110 from another computer readable medium. For example, the trading application (or updates to the trading application) is stored by a manufacturer, developer, or publisher, such as via one or more CDs or DVDs or other portable storage media that are provided for loading the application onto the trading device 110 or to a server from which the trading device 110 retrieves the trading application. The trading device 110 also or alternatively may receive the trading application (or updates to the trading application) from a server, such as via the Internet or an internal network. The trading device 110 may receive the trading application or updates when requested by the trading device 110 ("pull distribution") and/or un-requested by the trading device 110 ("push distribution").

The trading device 110 is generally adapted to send, submit or otherwise place orders for a tradeable object. The orders may be sent in one or more messages or data packets or through a shared memory system. The trading device 110 also or alternatively may be adapted to cancel orders, change orders, and/or query an exchange. The trading device 110 also or alternatively may be adapted to send orders to a simulated exchange in a simulation environment that does not effectuate real-world trades.

The orders sent via the trading device 110 may be sent in response to a request of a user and/or automatically by the trading device. In an example, a trader utilizes an electronic trading workstation to place an order for a tradeable object by manually manipulating the trading device 110 or components thereof to provide one or more parameters, such as an order price and/or quantity. An automated trading tool may, for example, calculate one or more parameters for an order and automatically send the order. In some instances, an automated trading tool may prepare the order to be sent but not actually send it without confirmation from the user, expiration of a time interval or some other triggering event.

The trading device 110 may include a user interface. In an example, the user interface includes one or more display devices that present a text-based and/or a graphical interface, such as of a trading application. The display devices may include computer monitors, hand-held device displays, projectors, wearable devices, televisions and/or other devices or apparatuses that display context to the user. The user interface may be used for specifying and/or reviewing parameters for an order. The user interface may include one or more input devices for receiving input, such as a keyboard, trackball, two or three-button mouse, touch screen and/or other devices for interacting with a user. For example, information may be audibly provided to a user through a speaker and/or received through a microphone.

A trading application may include one or more trading screens enabling user interaction with one or more markets to obtain and view market information, set order entry parameters, enter and cancel orders, and/or monitor positions while implementing various trading strategies, for example. In an example, a trading application receives information (such as bid prices, bid quantities, ask prices, ask quantities, prices and quantities for past sales, and/or other market related information) from exchange 130, some or all of which, in turn, may be displayed with a user interface of trading device 110. The trading screen may display all or a range of price levels and corresponding bid and ask quantities for the price levels in regard to tradeable objects. To provide pertinent trading information, the trading screen may display a range of prices (and the corresponding bid and ask quantities) at, around or near the inside market for one or more tradeable objects. The information may be continuously, regularly and/or periodically distributed. The trading application receives the information and the trading screen may be updated with current market information. A user may use the trading screen to place buy and sell orders for tradeable objects or to otherwise trade the tradeable objects based on the displayed information.

Trading screens may provide one or more trading tools. A trading tool may be considered an electronic tool that allows, assists with, administers and/or facilitates electronic trading of tradeable objects. Exemplary trading tools include, but are not limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

The gateway 120 generally communicates with the trading device 110 and the exchange 130. As such, the gateway 120 facilitates communication between the trading device 110 and the exchange 130. For example, the gateway 120 receives orders from the trading device 110 and transmits the orders to the exchange 130. The gateway 120 also or alternatively receives market data from the exchange 130 and transmits the market data to the trading device 110. In an example, the gateway 120 communicates with the exchange 130 using a local area network, a wide area network, a virtual private network, a T1 line, a T3 line, an ISDN line, a point-of-presence, the Internet, and/or a shared memory system.

The gateway 120 also or alternatively may process data communicated between the trading device 110 and the exchange 130. The gateway 120 may process an order received from the trading device 110 into a data format understood or otherwise capable of being processed by the exchange 130. The gateway 120 also or alternatively may transform market data in an exchange-specific format received from the exchange 130 into a format understood or otherwise capable of being processed by the trading device 110. The processing of the gateway 120 may also include tracking orders from the trading device 110 and updating the status of the order based on fill confirmations received from the exchange 130. The market data from the exchange 130 may be coalesced by the exchange 130 and/or gateway 120. The gateway 120 may provide services other than processing data communicated between the trading device 110 and the exchange 130, such as risk processing.

The gateway 120 may include one or more electronic computing platforms, such as a hand-held device, laptop, desktop computer, workstation with a single or multi-core processor, server with multiple processors, and/or cluster of computers. The gateway 120 may include one or more gateway applications, which may, for example, handle order processing and market data processing. This processing may be based on user preferences.

In general, the exchange 130 is generally accessible by multiple parties using trading devices 110 and is owned, operated, controlled, or used by an entity other than users of the trading device 110, such as an exchange entity. Orders may be received from a trading device 110 through the gateway 120, for example. In addition, the orders may be received from other devices in communication with the exchange 130. That is, typically the exchange 130 will be in communication with a variety of other trading devices (which may be similar to trading device 110) that also provide orders to be matched. Example exchange entities include the CME Group, Chicago Mercantile Exchange, Chicago Board of Trade, New York Mercantile Exchange, New York Stock Exchange/London International Financial Futures and Options Exchange ("NYSE LIFFE"), the Intercontinental Exchange ("ICE"), and Eurex. The exchange 130 generally includes an electronic matching system, such as a computer, server, or other computing device, for receiving and matching orders for tradeable objects, for example, offered for trading by the exchange. The electronic matching system may include a matching engine. The exchange 130 may include separate entities, some which list and/or administer tradeable objects and others which receive and match orders, for example. The exchange 130 may include an electronic communication network ("ECN"), a clearinghouse for matched orders and a market data reporting facility.

Market data distributed by the exchange 130 may be provided in one or more messages or data packets or through a shared memory system. The market data may be received by the trading device 110 such as through the gateway 120. The market data may include data that represents the inside market. The inside market generally is the lowest sell price (also referred to as the "best ask") and the highest buy price (also referred to as the "best bid"). Since the inside market may vary over time, the inside market may be provided for an instant in time for a given range of time, and/or for one or multiple updates to the inside market.

The market data may include market depth. Market depth refers to quantities available at the inside market. Market depth may also refer to quantities available at other prices away from the inside market. Thus, the inside market may be considered the first level of market depth and one tick away from the inside market may be considered the second level of market depth. Market depth is provided for all price levels or for less than all price levels. For example, market depth is provided only for the first five price levels on both sides of the inside market. In another example, market depth is provided for the first ten price levels at which quantity is available in the market. The market data may also include information such as the last traded price (LTP), the last traded quantity (LTQ), order fill and other information related to market events.

The system 100 may include more than one trading device 110 in communication with the gateway 120 to send orders to the exchange 130. The system 100 also or alternatively includes more than one gateway 120 that are in communication with the trading device 110 and the exchange 130 such as to provide redundancy of fail-over should one gateway 120 fail. The system 100 also or alternatively may include more than one exchange 130, such as a trading device 110 that can trade at more than one exchange through the gateway 120. The system 100 also or alternatively may include more than one exchange 130 and more than one gateway 120 such as where each gateway may be in communication with one or more different exchanges.

The gateway 120 also may be physically located proximate the trading device 110 or physically located proximate the exchange 130. The trading device 110 also may be physically located proximate the exchange 130. The gateway 120 also may be physically located at a site separate from both the trading device 110 and the exchange 130.

III. Example Computing Device

Figure 2:
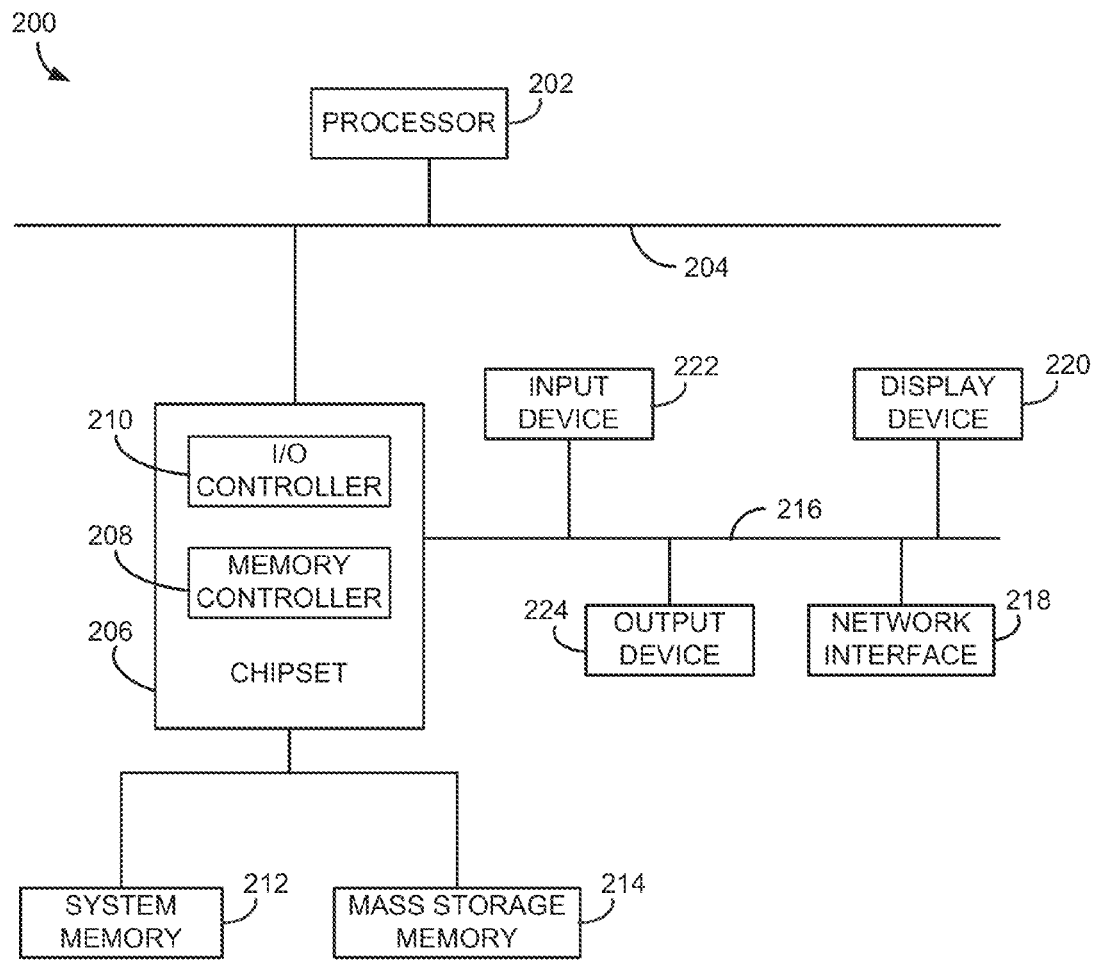
FIG. 2 is a block diagram of an example computing device that may be used to implement embodiments for a speed adjustable and reversible tool for slicer orders.

FIG. 2 illustrates a block diagram for an exemplary computing device 200 for a speed adjustable and reversible tool for slicer orders. The computing device 200 includes a processor 202, an interconnection bus 204, a chipset 206, a memory controller 208, an input/out (I/O) controller 210, a system memory 212, a mass storage memory 214, an I/O bus 216, a network interface 218, a display 220, an input device 222, and an output device 224. The computing device 200 may include additional, different, or fewer components. For example, multiple buses, multiple processors, multiple memory devices, multiple network interfaces, multiple display devices, multiple input devices, multiple output devices, or any combination thereof, may be provided. The computing device 200 also may not include an output device 224 separate from the display device 220, may not include a display device 220 altogether and/or may not include an input device 222. Instead, for example, the computing device 200 may be controlled by an external or remote input device via the network interface 218.

The computing device 200 includes a processor 202 coupled to an interconnection bus 204. The interconnection bus 204 may include a communication bus, channel, network, circuit, switch, fabric, or other mechanism for communicating data between components in the computing device 200. The interconnection bus 204 may be communicatively coupled with and transfer data between any of the components of the computing device 200. For example, when installing a trading application, one or more computer-readable instructions that are to be executed by the processor 202 may be transferred from the input device 222 and/or the network interface 218 to the system memory 212 and/or the mass storage memory 214. When the computing device 200 is running or preparing to run the trading application stored in the system memory 212 and/or the mass storage memory 214, the processor 202 may retrieve the instructions from the system memory 212 and/or the mass storage memory 214 via the interconnection bus 204.

The processor 202 may be any electronic processor, processing unit, or microprocessor and may include one or more general processors, digital signal processors, application specific integrated circuits, field programmable gate arrays, analog circuits, digital circuits, programmed processors, and/or combinations thereof, for example. The processor 202 may be a single device or a combination of devices, such as one or more devices of a network or distributed processing. Any processing strategy may be used, such as multi-processing, multi-tasking, parallel processing, and/or remote processing. Processing may be local or remote and may be moved from one processor to another processor. The computing device 200 may include one or more additional processors that are communicatively coupled to the interconnection bus 204.

The processor 202 may be operable to execute logic encoded in one or more tangible media, such as the system memory 212, the mass storage memory 214, and/or via the network interface 218. As used herein, logic includes instructions that are executable by the processor 202 or a different processor. The logic may be stored as part of software, hardware, integrated circuits, firmware, and/or micro-code. The logic may be received from an external communication device via a communication network, for example, connected to the Internet. The processor 202 may execute the logic to perform the functions, acts, or tasks illustrated in the Figures or described herein.

The processor 202 is coupled to the chipset 206, which includes the memory controller 208 and the I/O controller 210. The chipset 206 may provide I/O and memory management functions as well as a plurality of general purpose and/or special purpose registers and timers that are accessible or used by one or more processors. The memory controller 208 enables the processor 202 (or multiple processors if applicable) to access the system memory 212 and the mass storage memory 214.

The system memory 212 and the mass storage memory 214 may be one or more tangible media, such as computer readable storage media. The system memory 212 may include volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, any other tangible data storage device, any combination thereof. The mass storage memory 214 may include various types of mass storage device, such as a hard disk drive, optical media, magnetic tape, any other tangible data storage device, or any combination thereof. The system memory 212 and the mass storage memory 214 may be non-transitory.

The system memory 212 and the mass storage memory 214 may be a single memory module. The system memory 212 and the mass storage memory 214 may be adjacent to, part of, programmed with, networked with, and/or remote from processor 202, such that data stored in the system memory 212 and the mass storage memory 214 may be retrieved and processed by the processor 202. The system memory 212 and the mass storage memory 214 may store instructions that are executable by the processor 202. The instructions may be executed to perform one or more of the acts or functions described herein or shown in the Figures.

The I/O controller 210 may enable the processor 202 to communicate with the network interface 218, the display 220, the input device 222, and the output device 224 through an I/O bus 216. While the memory controller 208 and the I/O controller 210 are depicted in FIG. 2 as separate blocks, the memory controller 208 and the I/O controller 210 may be considered integral to a singular component or separate components. One or more of the components of the computing device 200 may be implemented as a system on a chip (for example, a system on a chip in an IPHONE™).

The network interface 218 may be a one-way or two-way communication coupling. The network interface 218 may communicatively connect one, two, or more communication networks or devices. For example, the interconnection bus 204 may be coupled with a gateway similar to gateway 120 of FIG. 1 via the network interface 218, such that one, some, or all of the components of the computing device 200 are accessible or may communicate with the gateway. The network interface 218 also or alternatively may couple the interconnection bus 204 with other communication networks. The network interface 218 may be, for example, an integrated services digital network (ISDN) card or a modem to provide a data communication connection. The network interface 218 may be a local area network (LAN) card to provide a data communication connection to a compatible LAN, for example, connected to the Internet. Wireless links may also be implemented. The network interface 218 may send and receive electrical, electromagnetic, or optical signals that carry analog or digital data streams representing various type of information.

The display device 220 may include a visual output device, cathode ray tube (CRT) display, electronic display, electronic paper, flat panel display, light-emitting diode (LED) display, electroluminescent display (ELD), plasma display panel (PDP), liquid crystal display (LCD), thin-film transistor display (TFT), organic light-emitting diode display (OLED), surface-conduction electron-emitter display (SED), laser television, carbon nanotubes, nanocrystal display, head-mounted display, projector, three-dimensional display, and/or transparent display device. In an example, the display device 220 provides, visually presents or otherwise displays a trading screen, such as the trading screen discussed above.

The input device 222 may include a keyboard, mouse, microphone, touch-screen, trackball, keypad, joystick, and/or other device for providing input and/or command selections to processor 202. For example, the input device 222 may be a mouse for controlling a cursor on a trading screen. The mouse may include one or more buttons for selection and control.

The output device 224 may include a keyboard, mouse, speakers, touch-screen, trackball, keypad, haptic device or system, joystick, and/or other device for providing output, for example. For example, the output device 224 may be used to output one or more signals, such as a haptic signal or an audio signal, to a user. While the input device 222 and output device 224 are depicted in FIG. 2 as separate blocks, the functions performed by these blocks may be integrated into a single I/O device.

IV. Slicer Orders

Slicer orders have component parts (referred to herein as child orders) that are sent to one or more markets to collectively buy or sell a total quantity of a tradeable object. The child orders may be are generally submitted or sent for trading separately and independently. The child orders also may be submitted for trading consecutively and/or simultaneously.

A trading device generally sends at least one of the child orders to one or more markets in response to, one or more events or conditions. The event may be defined by the slicer order, such as an amount of time elapsing or a volume of activity occurring at the market(s). After an initiation or activation of the slicer order, the trading device may then automatically send the child orders, when triggered, to the market(s) to collectively buy or sell or otherwise trade the total quantity of the parent order. In addition to or in lieu of automatically sending child orders to the markets in response to triggers or detected events, the trading device can send child orders in response to direct user input. For example, the user instructs the trading device to send a child order and the trading device assists the user by tracking fill quantity and prices, insuring a sum of the child quantities does not exceed the parent quantity, processing delete and quantity change requests, etc.

FIG. 3 is an exemplary screenshot 300 of a user interface for communicating slicer order information via trading device, such as the trading device 110. The slicer order screenshot 300 shows a parent order 302 having multiple child orders 304. Each of the child orders 304 is for a designated quantity shown in quantity column 306 and a price shown in price column 308. The order quantities of the child orders 304 add up to the total quantity of the parent order 302.

The slicer order screenshot 300 includes an undisclosed quantity column 310, which generally indicates a quantity that has not yet been sent to market. FIG. 3 shows that the child orders 304 are working in status column 316, and thus, all child orders 304 have all been sent to a market. According to the example in the slicer order screenshot, the undisclosed quantity as shown in column 310 of the slicer order is zero.

The slicer order screenshot 300 shows that the slicer order is a time slicer order. As such, each of the child orders 304 has been sent to one or more markets defined in an exchange column 312 when a defined time interval elapsed and/or when a time and date occurred. A filled quantity column 314 is updated to indicate how much of the respective child order quantities and the parent order quantity is filled. The quantity column 314 may be updated as the component orders are filled. The markets and other factors are constantly changing, varying or otherwise being updated. The slicer order screenshot 300 shows an example at a moment in time and may be changing with updated market information in an implementation. Additional or alternative information may also be presented.

The slicer order be adjusted, modified or otherwise changed after the slicer order has been implemented. For example, the slicer order may be changed after the slicer order has been configured, after the slicer order has been submitted, after the component child orders have been implemented or established, and/or after one or more of the child orders have been submitted for trading. In an example, one or more aspects of the slicer order may be modified after or when the slicer order is working in a market. For example, the total quantity of the parent order may be modified after at least a portion of at least one of the child orders has been sent to the market(s). In addition, the triggering events or conditions for submitting one or more child orders may also be modified.

Unlike previous systems, embodiments for a speed adjustable and reversible tool for slicer orders allow a user to change a speed at which the slicer order is operating. The speed at which the child orders are submitted may be increased or decreased. The changes to the slicer orders may be made in an intuitive manner for the user. Embodiments for a speed adjustable and reversible tool for slicer orders also or alternatively provide a user the ability to place a slicer order in reverse, such as to remove working quantity in a slicer-like fashion.

V. Speed Adjustable and Reversible Slicer Order Tool

Figure 4:
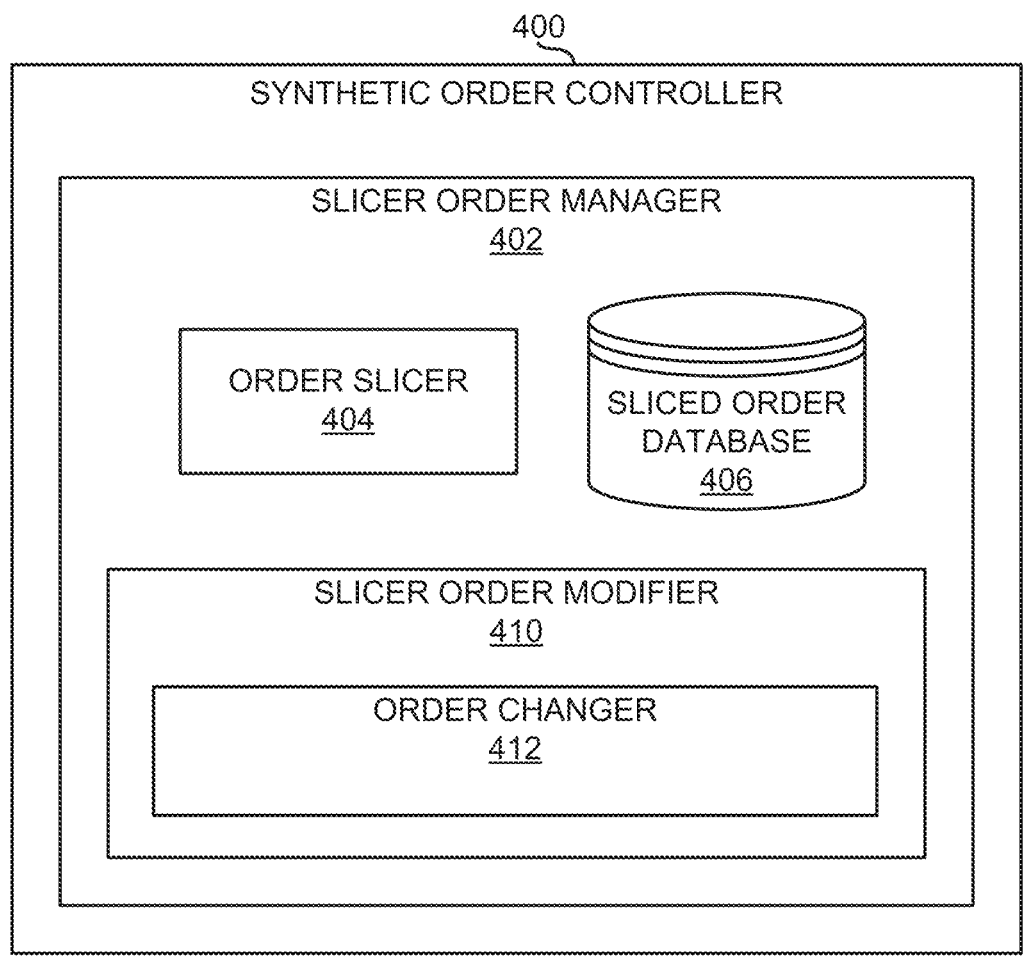
FIG. 4 is a block diagram of an example slicer order controller for implementing a speed adjustable and reversible tool for slicer orders.

FIG. 4 is a block diagram of an example slicer order controller 400 that may be used to implement a speed adjustable and reversible tool for slicer orders. In addition to other types of synthetic orders to implement different trading strategies (for example, trailing orders or retry orders), the example slicer order controller 400 of FIG. 4 implements slicer orders using a slicer order manager 402.

The example slicer order manager 402 includes an order slicer 404 to generate child orders from a submitted parent order. The child orders may be generated in accordance with instructions provided by a user. The order slicer 404 may include explicit instructions for triggers, prices, quantities, etc. for generating child orders from the corresponding parent order. The order slicer 404 may include one or more predefined slicing strategies. The slicing strategies may break or slice the parent order into child orders according to a predefined configuration involving a manner in which one or more parameters (for example, triggers, prices, quantities, volumes, etc.) of the slicer order are to be set. In some examples, the order slicer 404 combines user instructions regarding first parameter(s) with predefined configuration(s) to set the parameters of the slicer order.

The configuration, parameters, and other data related to the slicer order are stored in a slicer order database 406. The configuration, parameters and other data may be stored when the slicer order is configured, after the slicer order is submitted or at any time that associated with requesting a slicer order. The slicer order database 406 stores the slicer order data in any suitable manner or data structure such that the data of the stored slicer orders is readily available to other components of the example controller 400.

The slicer order manager 402 may include a slicer order modifier 410. In an example, the slicer order modifier 410 administers requests from a user for adjusting one or more slicer orders, such as increasing the quantity that is working in the market, increasing the speed by which child orders are submitted to the market, decreasing the speed by which the child orders are submitted, and/or pulling quantity that is working in the market. The example slicer order modifier 410 receives requests associated with slicer orders that may be stored in the database 406 (or any other storage device).

In some examples, the slicer order associated with the request may not yet be working in a market (for example, no child order has been sent to market). When the slicer order associated with an adjustment request is not working in a market, the example slicer order modifier 410 may use an order changer 412 to adjust the slicer order according to the received request. Because no child order has been sent to the market yet, the example order changer 412 of FIG. 4 does not encounter significant difficulty in adjusting the quantity. Similarly, the slicer order associated with an adjustment request that is not working in a market may be deleted and a new slicer order with new child orders generated.

Adjusting a slicer order that includes at least one child order working in the market (for example, speed up, slow down, or reverse a slicer order) may not be as straightforward as adjustments made to slicer orders that have not yet sent a child order to market (do not have any working child orders). For example, when the synthetic order controller 400 is working at least a portion of the slicer order in the market, that portion may be at least partially filled before the adjustment is achieved. In such situations, the slicer order may be managed to provide rapid resolution to the requested adjustment of the slicer order. An example of tool for adjusting a slicer order is provided at U.S. patent application for a Slicer Order Quantity Reduction Tool, U.S. patent application Ser. No. 13/416,561, filed on Mar. 9, 2012, which is incorporated in its entirety herein.

Figure 5:
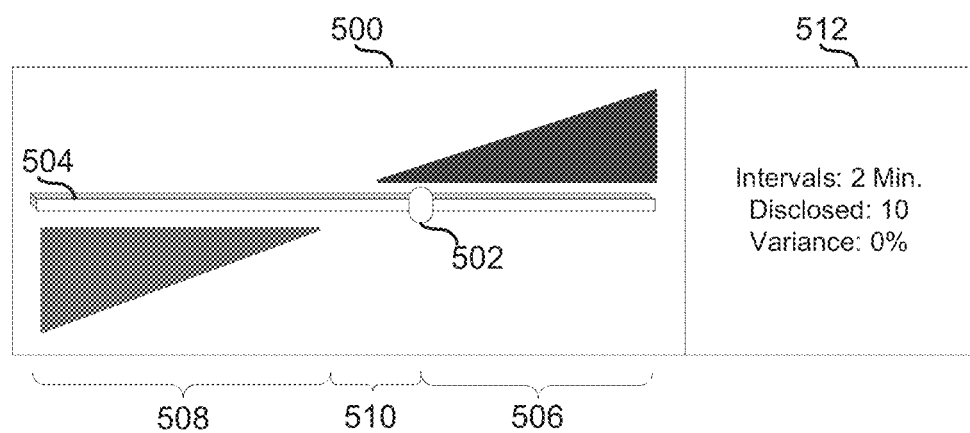
FIG. 5 illustrates a combined controller for speed and volume adjustment for a slicer order.

FIG. 5 illustrates an exemplary combined controller 500 for speed and volume adjustment for a slicer order. The combined controller 500 may be considered a tool used by one or more traders to modify one or more slicer orders that have been submitted for trading, a slicer order with one or more child orders that have been submitted for trading and with one or more child orders that have been executed, and/or a slicer order having child orders that have yet to be submitted for trading. The combined controller 500, for example, may be implemented using the exemplary computing device 200 of FIG. 200. A user, such as a trader, operates the combined controller 500 to provide instructions to the computing device for adjusting one or more parameters of the slicer order controlled by the combined controller 500. In response to the user commands, the computing device executes instructions to adjust or re-plan the child orders of the submitted slicer order.

In an example, the combined controller 500 is used to adjust a slicer order having one or more child orders that have been submitted for trading, a slicer order with one or more child order that have been submitted for trading and with one or more child orders that have been executed, and/or a slicer order having child orders that have yet to be submitted for trading. For example, the combined controller 500 may be used to speed up execution and/or submission of the slicer order for trading, to slow down execution and/or submission a slicer order, and/or reverse a slicer order to remove components of a slicer order from a market, and combinations thereof. Adjusting the speed of the execution and/or submission of the slicer order also may be referred herein as speeding up, slowing down or reversing the slicer order.

Execution and/or submission of a slicer order may be sped up, for example, by adding quantity to the market more quickly. For example, the child orders of the slicer order may be added or submitted to the market more quickly by decreasing an amount of time or time intervals between submissions of each child order of the slicer order. In an example, a slicer order for a total desired quantity of 50 to be sped up includes one working child order for a quantity of 10 and four yet to be submitted child orders, each for a quantity of 10 to be submitted at intervals of 2 minutes between submissions of sequential child orders. In response to a user command, the slicer order may be sped up, for example, by decreasing the time interval, such as to 1 minute, 30 second, 10 second, by a specified amount or percentage of the time interval, or any other time that is less than the original time interval. Similarly, the time interval may be decreased or eliminated altogether so that one, some or all of any reaming child orders to be submitted to the market are submitted potentially or substantially immediately. In an example, the combined controller 500 may be used to add remaining quantity of a slicer order to the market immediately. In another example, the slicer order is sped up by submitting only the next child order to be submitted potentially or substantially immediately. By decreasing the time interval between submissions of sequential child slicer orders, the amount of time to submit the total desired quantity of 50 of the slicer order may be decreased.

In addition or alternatively, a quantity of some or all of the child orders of the slicer order may be increased. For example, a slicer order for a total desired quantity of 25 may have one child order working a quantity of 5 and four remaining child orders, each for a quantity of 5. In response to receiving a command to speed up the slicer order by increasing the quantity of the child orders, the quantity of the child orders yet to be submitted may be adjusted. In an example, the next child order may be adjusted so that the remaining quantity is added to the next child order. In another example, one or multiple child orders to be submitted may be cancelled and the quantity of those orders added to the remaining child order. For example, where the slicer order for 25 is sped up, the quantity of the next two child orders may be increased to 10 and the remaining two orders cancelled. Accordingly, the amount of time for the total desired quantity of 25 of the slicer order is decreased, and thus, the quantity reaches the market sooner.

An example for speeding up execution of a slicer order includes increasing the quantity of each remaining child order. In such an example, the total desired quantity of the slicer order may also be increased. For example, a slicer order for total desired quantity of 20 with one working child 2 and nine remaining child orders each for a quantity of 2 may be sped up by increasing the quantity of each remaining child order to be submitted, such as by 2. As a result, the slicer order will have one child order with a quantity of 2 and nine remaining child orders each with a quantity of 4 for a total quantity of 38. Thus, in the example, the total desired quantity of the slicer order is increased from 20 to 38, by increasing the quantity of the remaining child orders to be submitted.

The speed of execution and/or submission for a duration type slicer order may also be adjusted. A duration type slicer order is generally a slicer order that is to be executed and/or submitted for trading within a specified time, time period, and/or time interval. A duration slicer order is also generally defined by the total time of the slicer order and at least one of a time interval between submissions of child orders of the slicer order and a quantity on which each child order is based. For example, a duration slicer order for a desired quantity (for example 100) of a tradeable object to be submitted within a specified time (for example, within 1 hour) at a specified time interval (for example 6 minutes between submissions). The example, thus includes include submitting 6 child orders each for a quantity of 10 so that a total quantity for child orders is for the desired quantity (100) and where the all of the child orders are to be submitted within 60 minutes. The time interval may be user-specified, automatically determined, or based on other conditions such as the market closing.

The duration order may be speed up by, for example, decreasing the time interval between submissions of the child order. The duration slicer order also or alternatively may be sped up by increasing the quantity of one or more of subsequent child orders, such as one or more of the next child to be submitted. The adjustments may include removing or reducing quantity of later child orders to be submitted in response to increasing quantity of one or more of the child orders.

In another example for speeding up a volume slicer, the market trigger for submitting child orders may be adjusted so that the child orders may reach the market in less time. For example, a volume slicer order for a total desired quantity of 40 may have two working child orders each for a quantity of 4 and eight child orders each for a quantity of 4 to be submitted to the market in response to a market condition. The market condition may be the volume of the inside market to the total volume of the market, the total volume of a specified market depth and/or number of ticks away from the inside market, the volume of at the highest bid, the volume lowest ask, the volume of the last trade, the total traded quantity of the market, a delta of the total traded quantity of the market, the summation of one or more last traded quantity updates, the price of the lowest trade or any other market event. In the exemplary volume slicer order for a total desired quantity of 40, the next child order to be submitted is sent to the market in response to a total bid volume at the inside market equals or is greater than 100. To speed up the volume slicer order, the trigger for the volume slicer order is adjusted to a total bid volume at the inside market equals or is greater than 50. Accordingly, the next child order may be sent sooner because the trigger for sending the child order requires less volume in the market, which may occur more frequently or sooner.

In an example for a volume slicer order, a time component may also or alternatively be considered. For example, a time component may be added when adjusting the trigger. The market fluctuates and yet may still not reach an adjusted trigger. To increase the likelihood that the slicer order is sped up in such an event, a time component can be considered. When the trigger is adjusted, for example to 100 from 50, a time component may be added or adjusted to trigger submission of one or more of the child orders. For example, a time component can be added to submit the next child order, or one or more child orders, within an amount of time if the trigger or condition is not reached. The time component may be applied to the next child order in the sequence, a set of child orders in the sequence, or all of the child orders in the sequence. The time component may be the same for all child orders or may vary. When a time component may exist, that time component also may be adjusted with adjustments to the trigger condition. An adjustment to the time component may be based on the adjustment to the trigger, for example, the same percentage, or be separately selected or configured.

In an example for a volume slicer, a quantity of some or all of the child orders of the volume slicer order also or alternatively may be increased. For example, a volume slicer order for a total desired quantity of 40 may have one child order working a quantity of 10 and three remaining child orders, each for a quantity of 10 to be triggered market in response to a total bid volume at the inside market equals or is greater than 100. In response to receiving a command to speed up the volume slicer order, the quantity of the next two child orders may be increased to 15, in addition to the trigger being adjusted to submit the orders to the market in response to a total bid volume at the inside market equal to or greater than 50. Accordingly, the amount of time for the total desired quantity of 40 of the slicer order is decreased, and thus, the quantity reaches the market sooner.

A slicer order also or alternatively may be slowed down. For example, a slicer order may be slowed down, for example, by removing quantity from child orders to be submitted so that quantity is added to the market less quickly. For example, the child orders of the slicer order may be added or submitted to the market less quickly by increasing an amount of time or time intervals between submissions of each child order of the slicer order. In an example, a slicer order for a total desired quantity of 50 to be slowed down has one working child order for a quantity of 10 and four yet to be submitted child orders, each for a quantity of 10 to be submitted at intervals of 2 minutes between submissions of sequential child orders. In response to a user command, the slicer order may be slowed down, for example, by increasing the time interval, such as to 3 minutes, 10 minutes, 30 minutes, by a specified amount or percentage of the time interval, or any other time that is less than the original time interval. Similarly, the time interval may be increased or set infinitely in length or substantially significantly altogether so that one, some or all of any reaming child orders to be submitted are not submitted to the market. In an example, the combined controller may be used to remove remaining quantity of a slicer order so that the remaining quantity is not sent to the market. By increasing the time interval between submissions of each child slicer order, the amount of time to submit the total desired quantity of 50 of the slicer order may be increased.

In addition or alternatively, a quantity of some or all of the child orders of the slicer order may be decreased. For example, a slicer order for a total desired quantity of 25 may have one child order working a quantity of 5 and four remaining child orders, each for a quantity of 5. In response to receiving a command to slow down the slicer order by decreasing the quantity of the child orders, the quantity of the child orders yet to be submitted may be adjusted. In an example, the next child order may be adjusted so that the quantity of the child slicer order is removed altogether, is reduced by an amount, and/or reduced by a percentage. In another example, one or multiple child orders to be submitted may be added to the child orders of the slider order to include or move quantity of the slicer order having quantity that was removed. For example, where the slicer order for 25 is slowed down, the quantity of the four remaining child orders may be decreased to 1. The remaining quantity of 16 of total desired quantity of the slicer order may be submitted in one or more new child slicer orders. In addition, or alternatively, no new child orders are generated, and instead quantity removed from child orders submitted earlier in the sequence is added to the last child order in the sequence and/or one or more of the last child orders in the sequence. In addition or alternatively, the slicer order may be slowed down by removing or reducing quantity from the next child order in the sequence and moving that removed or reduced quantity to one or more of the remaining child orders of the slicer order. Accordingly, the amount of time for the total desired quantity of 25 of the slicer order is increased, and thus, the quantity reaches the market later or less quickly.

The trigger may be adjusted for one, a selected set, or all of the remaining child orders of the slicer orders.

An example for slowing down a slicer order includes decreasing the quantity of remaining child orders, and thus, decreasing the total desired quantity of the slicer order. For example, a slicer order for total desired quantity of 20 with one working child 2 and nine remaining child orders each for a quantity of 2 may be slowed down by decreasing the quantity of each remaining child order to be submitted, such as by 1. As a result, the slicer order will have one child order with a quantity of 2 and nine remaining child orders each with a quantity of 1 for a total of 11. Thus, in the example, the total desired quantity of the slicer order is decreased from 20 to 11, by decreasing the quantity of the remaining child orders to be submitted.

The duration order also or alternatively may be slowed down by, for example, increasing the time interval between submissions of the child order. The duration slicer order also or alternatively may be slowed down by decreasing the quantity of one or more of subsequent child orders, such as one or more of the next child orders to be submitted. In addition, the adjustments may include removing or reducing quantity of later child orders to be submitted.

In another example for slowing down a volume slicer, a market trigger for submitting child orders may be adjusted so that an amount of time for the child orders to reach the market is increased. For example, a volume slicer order for a total desired quantity of 40 may have two working child orders each for a quantity of 4 and eight child orders each for a quantity of 4 to be submitted to the market in response to a market condition. The market condition may be the volume of the inside market to the total volume of the market, the total volume of a specified market depth and/or number of tick away from the inside market, the volume of at the highest bid, the volume lowest ask, the volume of the last trade, the total traded quantity of the market, a delta of the total traded quantity of the market, the summation of one or more last traded quantity updates, the price of the lowest trade or any other market event. In the exemplary volume slicer order for a total desired quantity of 40, the next child order to be submitted is sent to the market in response to a total bid volume at the inside market equals or is greater than 100. To slow down the volume slicer order, the trigger for the volume slicer order is adjusted to a total bid volume at the inside market equals or is greater than 200. Accordingly, the next child order may be sent later because the trigger for sending the child order requires more volume in the market, which may occur less frequently or later.

In an example for a volume slicer order, a time component may also or alternatively be considered. For example, a time component may be added when adjusting the trigger. To increase the likelihood that the slicer order is slowed down in such an event, a time component can be considered. When the trigger is adjusted, for example to 100 from 200, a time component may be added or adjusted to prevent or slow down submission of one or more of the child orders. For example, a time component can be added to prevent submission of the next child order, or one or more child orders, within an amount of time if the trigger or condition is reached. The time component may be applied to the next child order in the sequence a set of child orders in the sequence or all of the child orders in the sequence. The time component may be the same for all child orders or may vary. When a time component may exist, that time component also may be adjusted with adjustments to the trigger condition. An adjustment to the time component may be based on the adjustment to the trigger, for example, the same percentage, or be separately selected or configured.

A slicer order also or alternatively may be reversed. For example, a slicer order may be reversed, for example, by removing quantity from the market. The slicer order, and/or components of the slicer order, can be pulled from the market in a similar manner in which the child orders of the slicer order were submitted. In response to a command to reverse a slicer order, the processing of the slicer order and submission of child orders of the slicer order may be paused so that remaining or yet to be submitted child orders are not submitted for trading. For a slicer order having child orders working in the market, a timer, for example, may be set for removing the child orders. For example, a timer may be set based on the command to reverse the slicer order. The timer may set a time interval between sequential removals of child orders. When the timer trigger fires, one or more of the child orders of the slicer order may be removed from the market. The child order may be removed such as by sending a delete order message to the exchange. In addition or alternatively, in response to setting a timer set, a first child order may be removed immediately and a next child order of the slicer order removed after the timer fires. The sequence may repeat until all child orders are removed and/or another command is received to stop the reversal of the slicer order. In addition or alternatively, only a single child order will be removed, a select number of child orders will be removed, and/or a select quantity of the total desired quantity of slicer order will be removed by removing one or all of the child orders working in the market. In addition or alternatively, a single child order will have its quantity reduced, a select number of child orders will have their quantity reduced, and/or a select quantity of the total desired quantity of the slicer order will be removed by reducing the quantity of one or more child orders working in the market.

The slicer order may be reversed by removing quantity based on a triggering event in addition to or instead of the timer. The trigger may be any market event such as a quantity in the market, quantity at a price, quantity at the inside market, quantity on a side of the market, the inside market, a number of ticks away from or near an inside market, a last traded quantity, a last traded price, combinations thereof and the like. In an example, a slicer order having 4 working child orders may be reversed by removing the working child orders when a quantity at the inside (or one side of the inside market) is or remains below a level, when a quantity at one side of the inside market is or remains below a level, and/or in response to the inside reaching a particular level. To increase the likelihood that the working child orders will be removed, a timer component can be added so that the child orders are removed after a time interval even if the triggering event does not occur.

The child orders can be removed based on when the child order was submitted to the market, whether some of the quantity of child order was matched or executed, order quantity of the child orders, working quantity of the child orders, the current market conditions, the market conditions at the time that the child order was submitted, the conditions of the market at the time that the command to reverse the slicer order was received, the distance of the child order from the current market, the distance of the child order from the market at the time that the child order was submitted, combinations thereof and the like. For example, child orders furthest from the current market will be removed before child orders at or near the current market. In another example, the child order will be removed on a first-in-first-out basis so that the older child orders are removed before younger child orders.

When the child orders of the slicer order have been removed and there are no child orders of the slicer order working in the market, the slicer order may be reset. For example, the slicer order may be reset to the original configuration or setting and/or continued to be paused.

In the example where the slicer order is returned to the original configuration, child orders of the slicer order that were removed may be re-submitted for trading according to the original configuration. In addition or alternatively, the removed child orders may be replaced with new child orders. The child orders may be submitted automatically, such as immediately or in response to a monitored condition, and/or submitted in response to a command received from the user.

In the example where the slicer order is paused, the slicer order and the removed child orders of the slicer order may be deleted. In addition or alternatively, the removed child orders may be submitted in response to a command, such as a user command to restart the slicer order. The slicer orders also or alternatively may be adjusted before being submitted for trading.

Referring back to FIG. 5, the combined controller 500 allows a user to provide an input for adjusting a slicer order. The combined controller 500 may be implemented, for example, with a trading application used for a slicer order. For example, the trading application may include slicer order controller 400, which is also configured to implement the combined controller 500. The combined controller 500 may be presented via a display device, such as display device 220 to provide tool or interface for a user for instructing a computing device to re-plan a slicer order. For example, the combined controller can be used by a trader to speed up, slow down and/or reverse a slicer order that has been submitted for trading. The combined controller 500 may be displayed independent of other features provided by the trading application, or may be displayed with respect to other features of the trading application.

The exemplary combined controller 500 shown in FIG. 5 provides for a combined speed and volume adjustment for a slicer order. The combined controller may be provided for multiple slicer orders or for a single slicer order. For example, a combined controller 500 may provide for adjustment of multiple slicer orders. Alternatively, a combined controller may be provided for each slicer order for controlling each slicer order individually.

The exemplary combined controller 500 includes a slider 502 and a slider range 504. In the example, the slider 502 is movable or may be positioned along the slider range 504, such as between the ends of the slider range 504.

The slider 502 may be moved in response to a user command. The user command may be received via a user input device, such as a user selecting and moving the slider 502 via a mouse device, and/or via a gestural input, or via any other manner for providing instructions to the trading device. Once moved or repositioned, the slider 502 may remain at the position to which the slider 502 was moved, return to an original position along the slider range 504 and/or return to the position from which the slider 502 was moved. Although shown oriented horizontally, the slider range 504 may be oriented vertically or in any other orientation allowing positioning of the slider along the range.

The slider 502 may be automatically moved and/or repositioned. For example, the controller 500 may be shared by multiple traders of a trading desk, such as for a slicer order being watched, traded or otherwise administered by a group of traders. When one of the traders moves the slider 502 to control a shared slicer order, a slider 502 on a controller displayed for one or more of the other traders may also be moved. Thus, a trader's shared controller for a shared slicer order will have a slider that may moves when another trader moves the slider on the other's trader's controller.

The combined controller 500 may include a speed up range 506, a reversing range 508. The combined controller also may include a play/neutral range 510 between the speed up range 506 and the reversing range 508. The slider 502 may be positioned along the slider range 504 to a location within the speed up range 506, within the reverse adjustment range 508 and the play/neutral range 510. The speed up range 506 may provide for the same, greater or less adjustment of the slicer order than the reverse adjustment range 508, but in a different direction (for example, forward control versus reverse control).

The slider range 504 may have an absolute scale, such as 5- to 5, −100 to 100 or any other range or scale. For example, the reversing range 508 may be −100 to <0 the speed up range 506 may be >1 to 100 and the play/neutral range may be 0-1. For example, a location within the reversing range at a "−2" may result in reversing the slicer order at 2 times the speed at which the slicer order was entered. A location within the speed up range of 3 may result in speeding up the slicer order at 3 times the speed at which the slicer order was originally placed. A location at "0.5" of the play neutral range may result in slowing down submission of the slicer order by half the original speed, and a location of 1 may result in no changes to the slicer order and a location a location at "0" may result in pausing the slicer order altogether. Any values may be used for the slider range. Values for all, some, or none of the scale may be displayed numerically, graphically, with color-coding, combinations thereof and the like. The scale may be continuous or have discrete positions or locations. The scale may be logarithmic, linear, non-linear, exponential, user-defined, combinations thereof and the like.

In general, positioning of the slider 502 within the slider range 504 may affect re-planning of the child orders of the slicer order to adjust a time interval between submissions of the child order and move quantity of the slicer order that is distributed among one or more of the child orders of the slicer order. In response to a user command to move or otherwise position the slider 502 using the combined controller 500, both the volume and speed of the one or more slicer orders associated with or controlled by the combined controller 500 will be adjusted. Positioning of the slider 502 within the speed up range 506 along the slider range 504 may affect the speed of the one or more slicer orders controlled by the combined controller 506 in the forward direction. Similarly, positioning of the slider 502 within the reverse adjustment range may affect the speed of the one or more slicer orders controlled by the combined controller 506 in the reverse direction. Positioning the slider 502 within the play/neutral range 510 may not affect the speed of the slicer order.

In an example, the slider 502 may be positioned within the play/neutral range 510. With the slider positioned at the play/neutral range 510, the original configuration or parameters of the slicer order apply and no adjustment is applied to the slicer order. The slider 502 may be moved via a user input from the play/neutral range 502 to a position within the speed up range 506. With the slider 502 within the speed up range 506 of the combined control 500, both the speed and the volume may be adjusted to speed up the slicer order.

To speed up a slicer order, for example, the slider is moved away from within the play/neutral range 510 to a position within the speed up range 506. By moving the slider 502, the interval for sending the child orders is decreased and quantity added to the child orders. The further away from the play/neutral range 510 that the slider 502 is positioned within the speed up range 506, the more adjustment is provided to the slicer order in the forward direction. In other words, a position next to or proximate the play/neutral range 510 within the speed up range 506 affects less forward adjustment than a position that is furthest away from the play/neutral range 510. As such, the further the slider 502 is moved away from the play/neutral range 510 within the speed up range 506, the speed of the slicer will be affected greater. For example, a position within the speed up range 506 proximate the play/neutral range 510 may affect a small adjustment such as a decrease in the time interval and small increase in the volume in the next child order and a position that is furthest away within the speed up range 506 may affect a larger decrease (for example, elimination) of the time interval and a large increase in the volume in the next child order. The location within the speed up range 506 may determine the amount of adjustment to be made to the slicer order. The slider 502 may be moved from one location within the speed up range 506 to a new position within the speed up range 506 to adjust the slicer order according to the new position within the speed up range 506.

To pause, and or slow down the slicer order, the slider 502 may be positioned via a user input to a position within the play/neutral range 510. For example, the slider 502 may be moved from a position within the speed up range 506 to a position within the play/neutral range 510 to slow down the slicer order. In addition, the slider 502 may be moved from a position within the play/neutral range 510 to a new within the play/neutral range 510 to slow down the slicer. The location within the play/neutral range may determine the amount that the slicer order may be slowed down, paused or unaffected. For example, by moving the slider 502 to a location of 0.5 within the play/neutral range 510, the interval for sending the child orders is increased and quantity removed from one, some or all of the child orders. With the slider 502 positioned at a location of "0", the slicer order may be paused, and with the slider 502 positioned at a location of "1", the slicer order may not be affected.

The slider 502 also may be moved via a user input to a position within the reverse adjustment range 508. For example, the slider 502 may be moved from the play/neutral range 502 or from a position in the speed up range 506. With the slider 502 within the reverse adjustment range 508 of the combined controller 500, both the speed and the volume may be adjusted to reverse slicer order. For example, with the slider 502 positioned within the reverse adjustment range, quantity of the slicer order that is controlled by the controller 500 may be removed from the market by cancelling one, some or all of the child orders that are pending in the market.

The further away from the play/neutral range 510 that the slider 502 is positioned within the reverse adjustment range 506, the more adjustment is provided to the slicer order in the reverse direction. A position next to or proximate the play/neutral range 510 within the reverse adjustment range 506 affects less reverse adjustment than a position that is further away from the play/neutral range 510 within the reverse adjustment range 508. As such, the further the slider 502 is moved away from the play/neutral range 510 within the reverse adjustment range, the speed at which the child orders are removed from the market is increased. A position within the reverse adjustment range 506 proximate the play/neutral range 510 may affect small changes to the original slicer order, but in the reverse direction, and a position further from the play/neutral range 510 may affect more changes to the original slicer order.

The combined controller 500 may also include a textual display 512. The textual display 512 may present information related to the slicer order. For example, the textual display 512 may provide information related to the adjusted parameters of the slicer order. The textual display 512 also or alternatively may provide information related to a current setting for the parameter. The parameters, for example, may include the time interval, volume interval, duration, alternate time component, the quantity disclosed, quantity not yet disclosed, and variance. Variance for example may be, for example, a percentage by which parameters may be varied from an original setting. For example, a 0% variance will result in no changes or substantially no changes between child orders of the slicer order, a 1% variance will result in the quantity between child orders varying in a range of +1% of an original setting, and a 10% variance will result in the quantity between child orders varying in a range of +10% of an original setting.

Figure 6:
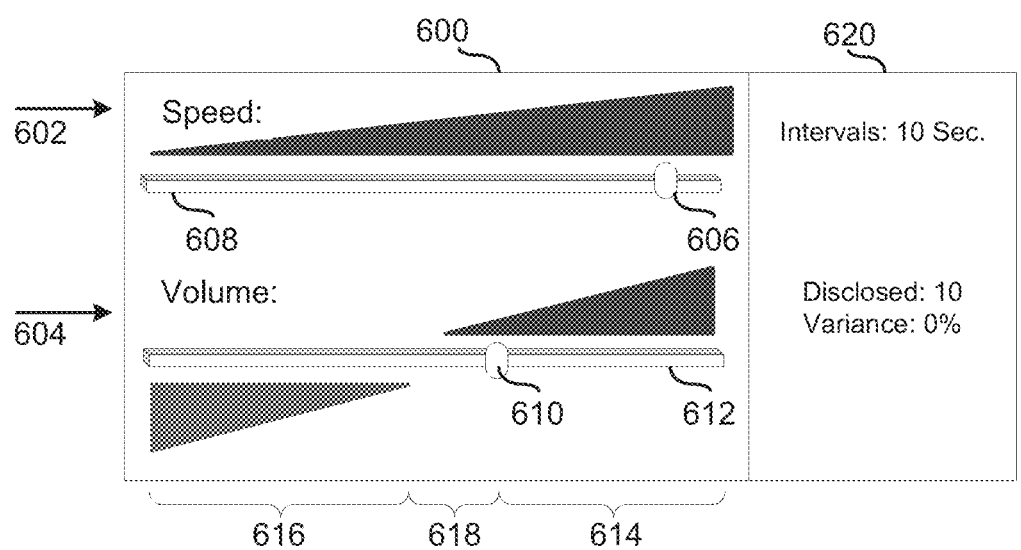
FIG. 6 illustrates a controller to adjust parameters of a slicer order with separate speed and volume adjustment.

FIG. 6 illustrates an exemplary controller 600 to speed up, slow down, and/or reverse a slicer order with separate speed and volume adjustment. As with the combined controller 500, the controller 600 may be considered a tool that is used to modify one or more slicer orders that have been submitted for trading, a slicer order with one or more child order that have been submitted for trading and with one or more child orders that have been executed, and/or a slicer order having child orders that have yet to be submitted for trading.

The controller 600 allows a user to provide one or more inputs for adjusting a slicer order. The controller 600, may be implemented using the exemplary computing device 200 of FIG. 200. The controller 600 may be implemented, for example, with a trading application used for a slicer order and may be presented via a display device, such as display device 220. As such, the controller 600 is used to provide instructions to the computing device for adjusting one or more parameters of the slicer order controlled by the controller 600. In response, the computing device executes instructions to adjust or re-plan the child orders of the submitted slicer order. The controller 600 may be displayed independent of other features provided by the trading application, or may be displayed with respect to other features of the trading application. The controller 600 provides for speed and volume adjustment for a slicer order for multiple slicer orders or for a single slicer order.

The controller 600 includes a speed adjuster 602 and a volume adjuster 604. The speed adjuster 602 may be manually adjusted, moved or otherwise positioned to adjust the speed of the one or more slicer orders controlled by the controller 600. The volume adjuster may be manually adjusted, moved or otherwise positioned to adjust the volume of the one or more slicer orders controlled by the controller 600.

The speed adjuster 602 includes a speed slider 606 and a speed slider range 608. The volume adjuster 604 includes a volume slider 610 and a volume slider rider range 612. In the example, the speed slider 606 is movable or may be positioned along the speed slider range 608, such as between the ends of the slider range 608, and the volume slider 610 is movable or may be position along the volume slider range 612, such as between the ends of the slider range 612.

The sliders 606 and 610 may be moved in response to a user command(s). In an example, both slider 606 and slider 610 are movable in response to a single, or the same user command. In another example, slider 606 and slider 610 are independently movable, where a user command to move slider 606 does not affect movement of slider 610 and a user command to move slider 610 does not affect movement of slider 606. In an example, movement of one slider is a master and the other slider is a slave, where movement of the master slider affects movement of the slave slider, but a movement of the slave slider does not affect movement of the master slider.

As discussed, the user command may be received via a user input device, a gestural input, or via any other manner for providing instructions or commands. Although shown oriented horizontally, the controller 600 may be oriented vertically or in any other orientation allowing positioning of the slider along the range.

The sliders 606 and 610 may be automatically moved and/or repositioned. For example, the controller 600 may be shared by multiple traders of a trading desk, such as for a slicer order being watched, traded or otherwise administered by a group of traders. When one of the traders moves one, both or either slider 606 and 610 to control a shared slicer order, a slider 606 and 610 on a controller displayed for one or more of the other traders may also be moved. Thus, a trader's shared controller for a shared slicer order will have a slider that may moves when another trader moves the slider on the other's trader's controller.

The speed slider range 608 may have an absolute scale, such as −5 to 5, −100 to 100, 0 to 500 or any other range or scale. The speed slider range 608 may have a range of values, such as all positive values, a zero value and positive values, and negative values, a zero value and positive values. A zero value, for example, may represent a location on the speed slider range 608 to pause a slicer order controlled by the controller 600. A value of 1 on the speed slider range 608 may represent a location where no changes to the speed of the slicer order will be affected. Positive values on the speed slider range 608 may result in speeding up the slicer order from its original configuration. Locations on the speed slider range 608 between 0 and 1 may result in slowing the slicer order from its original configuration. Though not shown in FIG. 6, the speed slider range 608 also may include a negative range with negative values that result in slowing down the slicer order from its original configuration. In an example, the speed slider range 608 has a scale of −100 to −100, where a location of "3" results in speeding up the slicer order by 3, a location of "−3" results in removing the slicer order at a speed of 3 by an order of 3 and a value of "0.5" results in slowing down the slicer order by half, for example. Any values may be used for the speed slider range 608. Values for all, some, or none of the scale may be displayed numerically, graphically, with color-coding, combinations thereof and the like. The scale may be continuous or have discrete positions or locations. The scale may be logarithmic, linear, non-linear, exponential, user-defined, combinations thereof and the like.

In general, positioning of the slider 606 within the speed slider range 608 may affect re-planning of the child orders of the slicer order to adjust a time interval between submissions of the child orders of the slicer order. In response to a user command to move or otherwise position the speed slider 606 using the controller 600, the speed of the one or more slicer orders associated with or controlled by the combined controller 600 will be adjusted. For a time slicer order, speed may be measured or defined by a time interval between submissions of sequential child orders of the slicer order, where the time slicer order may be sped up by decreasing the time interval. The time interval for a time slicer order may be adjusted by positioning the speed slider 606 along the speed slider range 608. For a volume slicer order, speed is defined, for example, by the quantity interval required to place a child order. For example, a child order is placed after a specified quantity is traded. The quantity of the child order may be adjusted by positioning the volume slider 610 along the volume slider range 612. For a duration order, the amount of time to submit the slicer order may be reduced.

In an example, the speed slider 602 may be positioned along the speed range slider 602 from a position where no adjustment to the speed of the controlled slicer is affected (for example a location associated with a value of "1") to a location for a desired increase in the speed of the controlled slicer order. For example, the speed slider 606 is moved from a zero adjustment range, (for example, a limit, edge, extremity, near extremity, end, proximate to an end, midpoint, substantial mid-point and the like of the speed slider range) to another position on the speed slider range 606 to decrease the interval for the time slice order or quantity interval for volume slice orders. The example shown for the controller 600 in FIG. 6 shows a leftmost location of the speed slider range 608 provides less speed adjustment than the rightmost. In addition or alternatively, a leftmost location of the speed slider range 608 may affect a pause of the slicer order. Though oriented so that increases in speed are provided from a left-to-right orientation, other orientations are possible as well. For example, the speed slider range 608 may provide increases in speed in a right-to-left orientation, top-to-bottom, bottom-to-top, or any other orientation. In an example, the leftmost position of the speed slider range 608 pauses the slicer order and the rightmost location of the speed slider range 608 provides a max speed adjustment. The speed slider range 608 may also provide a range where the slicer order is slowed from its original settings. The speed of the slicer order may be adjusted according to the scale for the speed slider range 608.

The volume slider range 612 may have an absolute scale, such as −5 to 5, −100 to 100, 0 to 500 or any other range or scale. The volume slider range 612 may have a range of values, such as all positive values, a zero value and positive values, and negative values, a zero value and positive values. A zero value, for example, may represent a location on the volume slider range 612 to pause a slicer order controlled by the controller 600. A value of 1 on the volume slider range 612 may represent a location where no changes to the volume of the slicer order and/or the child orders of the slicer order will be affected. Positive values on the volume slider range 612 may result in speeding up the slicer order from its original configuration, by adjusting the quantity of one or more of the child orders of the slicer order. Locations on the volume slider range 612 between 0 and 1 may result in slowing the slicer order from its original configuration. In an example, the volume slider range 612 has a scale of −100 to −100, where a location of "3" results in speeding up the slicer order by 3, a location of "−3" results in removing the slicer order at a speed of 3 by an order of 3 and a value of "0.5" results in slowing down the slicer order by half, for example. Any values may be used for the volume slider range 612. Values for all, some, or none of the scale may be displayed numerically, graphically, with color-coding, combinations thereof and the like. The scale may be continuous or have discrete positions or locations. The scale may be logarithmic, linear, non-linear, exponential, user-defined, combinations thereof and the like.

In an example, such as the example shown in FIG. 6, the volume adjuster 604 includes a forward volume adjustment range 614, a reverse adjustment range 616, and a play/neutral range 618 between the speed up range 614 and the reverse adjustment range 616. In response to a user command to move or otherwise position the volume slider 610 along the volume slider range 612, the volume of the one or more slicer orders associated with or controlled by the combined controller 600 will be adjusted. The one or more slicer orders associated with or controlled by the controller may have no orders pending in the market, at least one order pending in the market, and/or at least order that has been executed. The volume of the one or more slicer orders may be adjusted by re-planning the quantity for the child orders to be placed. For example, a quantity allocation of the child orders to be placed in the market may be adjusted, such as by moving quantity of child orders to be placed in the market later to child orders to be placed in the market sooner. In another example, child orders that are to be placed sooner may be cancelled and quantity of those cancelled child orders moved to at least one other child order to be placed in the market. In general, positioning of the slider 610 within the speed up range 614 may affect re-planning of the child orders of the slicer order to move quantity of the slicer order that is distributed among one or more of the child orders of the slicer order. Positioning of the slider 610 within the speed up range 614 may increase the quantity of one or more child orders of the slicer order, move quantity from one or more child orders to one or more other child orders, and may include cancelling one or more child slicer orders in response to moving the quantity of a cancelled child order to another child order to be submitted for trading. Similarly, positioning of the slider 610 within the reverse adjustment range may affect removal of child orders that have been submitted for trading and are pending execution at an electronic exchange. Positioning the slider 610 within the play/neutral range 618 may not affect the volume of the slicer order.

The controller 600 may also include a textual display 620. The textual display 620 may present information related to the slicer order controlled by the controller 600. For example, the textual display 620 may provide information related to the adjusted parameters of the slicer order. The textual display 620 also or alternatively may provide information related to a current setting for the parameter. The parameters, for example, may include the time interval, volume interval, duration, alternate time component, the quantity disclosed, quantity not yet disclosed, and variance.

The changes for a controlled slicer order may take effect immediately, or substantially immediately, following movement or positioning of the slider such as any of slider 502, 606, 618. Additionally or alternatively, the changes to a controlled slicer order may take effect in response to an additional input, such as an input received from the user. For example, a slider may be positioned to speed up a controlled slicer order, adjust the volume of the slicer order, and/or combinations thereof. In response, the user may be presented with a text box with information indicating some or all of the changed parameters, the original parameters, and/or the changes to the parameters. A confirmation area also may be presented by which the user inputs a command confirming the changes, and thereby affecting the changes to the slicer order.

In an example, changes to a controlled slicer order are controlled by conditional triggers. For example, the combined controller may be used to speed up a slicer order. Those changes are not affected unless triggered by a user defined algorithm. The user-defined algorithm can be provided to the trading application during set up of the slicer order, for example. The algorithm may be based on market conditions for the tradeable object in which the slicer order is placed, another tradeable object, market events and/or news, events external to the market, amount of time, period of time, a time of day, market closing and other now known or later developed factors considered for submitting and/or refraining from submitting an order to an exchange.

Adjustments made to a slicer order made via one or both controllers may affect changes to a left-over setting and/or a half-life setting of the slicer order. For example, a left-over setting may be used affect a submitted child order that is pending at, near or before submission of a next child order of the slicer order. A half-life setting may determine what to do with a child order that is pending at the electronic exchange at a mid-point, or some other point, in the time interval between submissions of the child orders. The left-over setting may include a pay-up setting, go to market setting, merge setting, and leave setting, for example. The half-life setting may include a pay-up setting and a go to market setting, for example. The controller may be configured to adjust a left-over and/or half-life setting to follow changes made to the slicer order. When the slicer order is adjusted, the left over setting may be adjusted to follow the adjustments so that the settings are made at the end of an adjusted time interval. For example, a left over setting for sending the child order to market before sending the next child order at the expiration of the time interval will adjust the time interval for sending the child order substantially with the adjustments to the increased/decreased time interval. In an example, the left-over and half-life settings may not be affected such that the original time interval for sending the child order to market is not affected with changes to the time interval for submitting child orders to the electronic exchange.

In an example, an alert, acknowledgement, confirmation or other notice may be provided to the user of the controller of the slicer order in response to a change to the slicer order. Alternatively or in addition, the alert, acknowledgement, confirmation or other notice may be distributed to other users in response to a change to the slicer order. For example, when a trader at a trading desk adjusts a slicer order, a notification of the changes is provided to other traders at the trading desk and/or a risk manager for the trading desk. The notification, for example, may indicate the slicer order, the changes made to the slicer order, and/or the new parameters of the slicer order.

Although FIGS. 5 and 6 show a slider that may be positioned along a slider range to affect a change to one or more existing or otherwise implemented slicer orders, other configurations for adjusting one or more parameters of the slicer order are within the scope of the disclosed embodiments. For example, one or more sets of radio buttons, rotary dials, selectable items (for example, an array, dropdown list and menu) and combinations thereof may be presented for affecting changes to one or more parameters of the slicer order. In addition or alternatively, parameters of a slicer order may be changed through a textual and/or numerical input.

Figure 7:
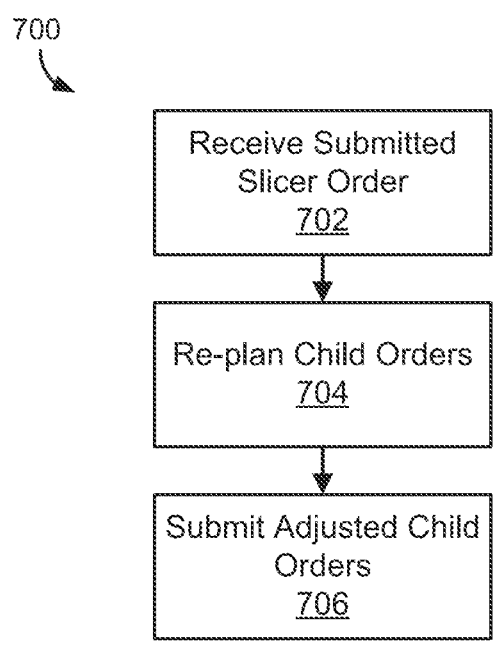
FIG. 7 is an exemplary flowchart 700 of process to implement a speed adjustable and reversible tool for slicer orders.

FIG. 7 is an exemplary flowchart 700 of process to implement a speed adjustable and reversible tool for slicer orders, such as combined controller 500 and controller 600. The exemplary process generally includes adjusting child orders of a submitted slicer order to speed up, slow down, or pause execution of the submitted order. In a method, a slicer order that has been submitted for trading is received 702. The slicer order may have one or more child orders. The slicer order may have one or more child orders that have been submitted for trading and may have one or more child orders that have been executed or matched. The slicer order is adjusted to re-plan the submission of the child orders 704. For example a time interval a quantity of one or more child orders, the duration and/or other parameters of the child orders may be adjust according to instructions received from a user to adjust the slicer order. Where one or more child order has been submitted according to an original setting, remaining child order to be submitted will be adjusted. The child orders are submitted according to the adjustments 706. The process 700 is exemplary. An embodiment may include the same, less or more steps than shown in FIG. 700.

Some of the described Figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the Figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A method of using a speed and quantity adjustable and reversible tool for slicer orders, comprising:
   receiving, by a user input device of a computing device, a plurality of parameters for implementing a slicer order for a tradeable object;
   in response to receiving a first user input that submits the slicer order that trades a quantity of the tradeable object, generating, by the computing device, a plurality of child orders for the slicer order, where the plurality of child orders are generated according to the plurality of parameters including at least one of a time interval between submissions of child orders of the plurality of child orders and a quantity of each child order and where a total quantity of the plurality of child orders comprises the quantity of the tradeable object;
   initiating, by the computing device, submission of the plurality of child orders to an electronic exchange;
   displaying, by a display device of the computing device, a user interface having a slicer controller slider configured to receive a user adjustment, the slicer controller slider being moveable along an adjustment slider range to control the slicer order, the slicer controller adjustment slider range having a first range that increases a speed of the submission of the slicer order to the electronic exchange, a second range that decreases the speed of the submission of the slicer order to the electronic exchange, and a third range that reverses the slicer order;
   receiving, by the user interface slicer controller slider of the computing device and prior to completing submission of the plurality of child orders, a second user input to move the slicer controller slider relative to the adjustment slider range to adjust the speed of the submission of the slicer order, the second user input being received subsequent to generating the plurality of child orders;
   in response to receiving the second user input to move the slicer controller slider relative to the first range to increase the speed of execution of the slicer orders:
      adjusting, by the computing device, at least one of the time interval between submissions of child orders of the plurality of child orders and the quantity of each child order, where the time interval is decreased and the quantity of at least one child order is increased, and
      submitting, by the computing device, a subset of the plurality of child orders remaining to be submitted subsequent to receiving the second user input, the subset of the plurality of child orders being submitted according to the adjusted at least one of the time interval and the quantity of each child order;
   in response to receiving the second user input to move the slicer controller slider relative to the second range to decrease the speed of execution of the slicer orders:
      adjusting, by the computing device, at least one of the time interval between submissions of child orders of the plurality of child orders and the quantity of each child order, where the time interval is increased and the quantity of at least one child order is decreased, and
      submitting, by the computing device, a subset of the plurality of child orders remaining to be submitted subsequent to receiving the second user input, the subset of the plurality of child orders being submitted according to the adjusted at least one of the time interval and the quantity of each child order; and
   in response to receiving the second user input to move the slicer controller slider relative to the third range to reverse the slicer orders:
      adjusting, by the computing device, at least one of the time interval between submissions of child orders of the plurality of child orders and the quantity of each child order to prevent submission of a subset of the plurality of child orders remaining to be submitted subsequent to receiving the second user input, and
      submitting, by the computing device, cancel orders to remove pending child orders from the electronic exchange based on a time interval between sequential removals of the pending child orders, the time interval between sequential removals of the pending child orders being adjustable according to movement of the slicer controller slider relative to the third range.

2. The method of claim 1 where at least one child order of the plurality of child orders is submitted to an electronic exchange prior to adjusting the at least one of the time interval and the quantity of each child order.

3. The method of claim 2 where the at least one child order of the plurality of child orders is working at the electronic exchange prior to adjusting the at least one of the time interval and the quantity of each child order.

4. The method of claim 2 where the at least one child order of the plurality of child orders is matched at the electronic exchange prior to adjusting the at least one of the time interval and the quantity of each child order.

5. The method of claim 1 where the slicer order comprises any of a time slicer order, volume slicer order, a duration order and a combination thereof.

6. The method of claim 1 where the plurality of parameters for implementing a slicer order for a tradeable object includes a market condition.

7. The method of claim 6 where the market condition comprises any of a volume of the tradeable object traded, a volume at an inside market for the tradeable object, a volume at a specified side of the inside market, market depth outside the inside market, market depth at a specified number of ticks, a total quantity traded since submission of at least one prior child order, a change in total quantity traded since submission of at least one prior child order, and combinations thereof.

8. The method of claim 1 where the at least one parameter comprises a volume of the tradeable object traded between submissions of child orders or the plurality of child orders.

9. The method of claim 1 further comprising:
   monitoring a user defined condition in response to receiving the first user input; and submitting at least one child order of the plurality of child order to the electronic exchange according to monitoring the user-defined condition.

10. A non-transitory tangible computer readable medium having instructions stored thereon that when executed by a processor cause the processor to execute acts comprising:
   receiving, by a user input device of a computing device, a plurality of parameters for implementing a slicer order for a tradeable object;
   in response to receiving a first user input that submits the slicer order that trades a quantity of the tradeable object, generating, by the computing device, a plurality of child orders for the slicer order, where the plurality of child orders are generated according to the plurality of parameters including at least one of a time interval between submissions of child orders of the plurality of child orders and a quantity of each child order and where a total quantity of the plurality of child orders comprises the quantity of the tradeable object;

initiating, by the computing device, submission of the plurality of child orders to an electronic exchange;

displaying, by a display device of the computing device, a user interface having a slicer controller slider configured to receive a user adjustment, the slicer controller slider being moveable along an adjustment slider range to control the slicer order, the slicer controller adjustment slider range having a first range that increases a speed of the submission of the slicer order to the electronic exchange, a second range that decreases the speed of the submission of the slicer order to the electronic exchange, and a third slider range that reverses the slicer order;

receiving, by the user interface slicer controller slider of the computing device and prior to completing submission of the plurality of child orders, a second user input to move the slicer controller slider relative to the adjustment slider range to adjust the speed of the submission of the slicer order, the second user input being received subsequent to generating the plurality of child orders;

in response to receiving the second user input to move the slicer controller slider relative to the first range to increase the speed of execution of the slicer orders:
　adjusting, by the computing device, the at least one of the time interval between submissions of child orders of the plurality of child orders and the quantity of each child order, where the time interval is decreased and the quantity of at least one child order is increased, and
　submitting, by the computing device, a subset of the plurality of child orders remaining to be submitted subsequent to receiving the second user input, the subset of the plurality of child orders being submitted according to the adjusted at least one of the time interval and the quantity of each child order;

in response to receiving the second user input to mover the slicer controller slider relative to the second range to decrease the speed of execution of the slicer orders:
　adjusting, by the computing device, the at least one of the time interval between submissions of child orders of the plurality of child orders and the quantity of each child order, where the time interval is increased and the quantity of at least one child order is decreased, and
　submitting, by the computing device, a subset of the plurality of child orders remaining to be submitted subsequent to receiving the second user input, the subset of the plurality of child orders being submitted according to the adjusted at least one of the time interval and the quantity of each child order; and in response to receiving the second user input to move the slicer controller slider to reverse the slicer orders:
　adjusting, by the computing device, at least one of the time interval between submissions of child orders of the plurality of child orders and the quantity of each child order to prevent submission of a subset of the plurality of child orders remaining to be submitted subsequent to receiving the second user input, and
　submitting, by the computing device, cancel orders to remove pending child orders from the electronic exchange based on a time interval between sequential removals of the pending child orders, the time interval between sequential removals of the pending child orders being adjustable according to movement of the slicer controller slider relative to the third range.

11. The non-transitory tangible computer readable medium of claim 10 where at least one child order of the plurality of child orders is submitted to an electronic exchange prior to adjusting the at least one of the time interval and the quantity of each child order.

12. The non-transitory tangible computer readable medium of claim 11 where the at least one child order of the plurality of child orders is working at the electronic exchange prior to adjusting the at least one of the time interval and the quantity of each child order.

13. The non-transitory tangible computer readable medium of claim 11 where the at least one child order of the plurality of child orders is matched at the electronic exchange prior to adjusting the at least one of the time interval and the quantity of each child order.

14. The non-transitory tangible computer readable medium of claim 10 where the slicer order comprises any of a time slicer order, volume slicer order, and a combination thereof.

15. The non-transitory tangible computer readable medium of claim 10 where the plurality of parameters include a market condition.

16. The non-transitory tangible computer readable medium of claim 15 where the market condition comprises any of a volume of the tradeable object traded, a volume at an inside market for the tradeable object, a volume at a specified side of the inside market, market depth outside the inside market, market depth at a specified number of ticks, a total quantity traded since submission of at least one prior child order, a change in total quantity traded since submission of at least one prior child order, and combinations thereof.

17. The non-transitory tangible computer readable medium of claim 10 where the at least one parameter comprises a volume of the tradeable object traded between submissions of child orders or the plurality of child orders.

18. The non-transitory tangible computer readable medium of claim 10 where the acts further comprise:
　monitoring a user defined condition in response to receiving the first user input;
　and submitting at least one child order of the plurality of child orders to the electronic exchange according to monitoring the user-defined condition.

19. A client trading device comprising:
　a user input device;
　an electronic display device configured to display a slicer controller being configured to receive a user adjustment for controlling a slicer order along an adjustment range, the slicer controller having a first range for increasing a speed of the submission of the slicer order, a second range for decreasing the speed of the slicer order and a third range for reversing the slicer order;
　a processor coupled with the user input device and the electronic display and configured to:
　　receive a plurality of parameters for implementing a slicer order for a tradeable object;
　　in response to receiving a first user input that submits the slicer order that trades a quantity of the tradeable object, generate a plurality of child orders for the slicer order, where the plurality of child orders are generated according to the plurality of parameters including at least one of a time interval between submissions of child orders of the plurality of child orders and a quantity of each child order and where a total quantity of the plurality of child orders comprises the quantity of the tradeable object;

initiate submission of the plurality of child orders that trade according to the plurality of parameters to an electronic exchange;

receive, by the user interface slicer controller slider and prior to completing submission of the plurality of child orders, a second user input to move the slicer controller slider relative to the adjustment slider range to adjust the speed of the submission of the slicer order, the second user input being received subsequent to generating the plurality of child orders;

in response to receiving the second user input to move the slicer controller slider relative to the first range to increase the speed of execution of the slicer orders:

adjust the at least one of the time interval between submissions of child orders of the plurality of child orders and the quantity of each child order, where the time interval is decreased and the quantity of at least one child order is increased, and submit a subset of the plurality of child orders remaining to be submitted subsequent to receiving the second user input, the subset of the plurality of child orders being submitted according to the adjusted at least one of the time interval and the quantity of each child order;

in response to receiving the second user input to move the slicer controller slider relative to the second range to decrease the speed of execution of the slicer orders:

adjust the at least one of the time interval between submissions of child orders of the plurality of child orders and the quantity of each child order, where the time interval is increased and the quantity of at least one child order is decreased, and submit a subset of the plurality of child orders remaining to be submitted subsequent to receiving the second user input, the subset of the plurality of child orders being submitted according to the adjusted at least one of the time interval and the quantity of each child order; and in response to receiving the second user input to move the slicer controller slider relative to the third range to reverse the slicer orders:

adjust at least one of the time interval between submissions of child orders of the plurality of child orders and the quantity of each child order to prevent submission of a subset of the plurality of child orders remaining to be submitted subsequent to receiving the second user input, and submit cancel orders to remove pending child orders from the electronic exchange based on a time interval between sequential removals of the pending child orders, the time interval between sequential removals of the pending child orders being adjustable according to movement of the slicer controller slider relative to the third range.

* * * * *